United States Patent
Hinni et al.

(10) Patent No.: US 10,355,911 B2
(45) Date of Patent: *Jul. 16, 2019

(54) SYSTEM AND METHOD FOR PROCESSING INFORMATION VIA NETWORKED COMPUTERS INCLUDING REQUEST HANDLERS, PROCESS HANDLERS, AND TASK HANDLERS

(71) Applicant: Appistry, LLC, St. Louis, MO (US)

(72) Inventors: Aaron Louis Hinni, Ballwin, MO (US); Guerry Anderson Semones, Marthasville, MO (US); Michael Scott Groner, Chesterfield, MO (US); Roberto Raul Lozano, Creve Coeur, MO (US)

(73) Assignee: APPISTRY, INC., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/979,145

(22) Filed: May 14, 2018

(65) Prior Publication Data
US 2018/0262385 A1    Sep. 13, 2018

Related U.S. Application Data

(60) Continuation of application No. 15/391,577, filed on Dec. 27, 2016, now Pat. No. 9,973,376, which is a
(Continued)

(51) Int. Cl.
*G06F 15/16* (2006.01)
*H04L 12/24* (2006.01)
(Continued)

(52) U.S. Cl.
CPC ............ *H04L 41/046* (2013.01); *H04L 41/00* (2013.01); *H04L 67/10* (2013.01); *H04L 67/16* (2013.01);
(Continued)

(58) Field of Classification Search
CPC ....... H04L 41/046; H04L 67/10; H04L 67/16; H04L 67/42; H04L 69/163
See application file for complete search history.

(56) References Cited

U.S. PATENT DOCUMENTS

| | | | |
|---|---|---|---|
| 5,357,632 A | 10/1994 | Pian et al. | |
| 5,511,208 A * | 4/1996 | Boyles | H04L 29/06 707/999.01 |

(Continued)

FOREIGN PATENT DOCUMENTS

| | | |
|---|---|---|
| JP | H10-222487 A | 8/1998 |
| KR | 1019980051002 | 1/2001 |

(Continued)

OTHER PUBLICATIONS

Czajkowski et al., "A Resource Management Architecture for Metacomputing Systems", Springer Berlin Heidelberg (1998), 21 pages.

(Continued)

*Primary Examiner* — Mohamed A. Wasel
(74) *Attorney, Agent, or Firm* — Thompson Coburn LLP

(57) ABSTRACT

Systems and methods for processing information via networked computers leverage request handlers, process handlers, and task handlers to provide efficient distributed processing of processing jobs. A request handler can receive service requests for processing jobs, process handlers can identify tasks to be performed in connection with the processing jobs, and task handlers can perform the identified tasks, where the request handler, the process handlers, and the task handlers can be distributed across a plurality of networked computers.

20 Claims, 25 Drawing Sheets

EXEMPLARY HIVE
COMPUTING ARCHITECTURE

Related U.S. Application Data continuation of application No. 14/722,963, filed on May 27, 2015, now Pat. No. 9,544,362, which is a continuation of application No. 14/176,378, filed on Feb. 10, 2014, now Pat. No. 9,049,267, which is a continuation of application No. 13/707,861, filed on Dec. 7, 2012, now Pat. No. 8,682,959, which is a continuation of application No. 13/491,893, filed on Jun. 8, 2012, now Pat. No. 8,341,209, which is a continuation of application No. 13/293,527, filed on Nov. 10, 2011, now Pat. No. 8,200,746, which is a division of application No. 12/127,070, filed on May 27, 2008, now Pat. No. 8,060,552, which is a division of application No. 10/236,784, filed on Sep. 7, 2002, now Pat. No. 7,379,959.

(51) Int. Cl.
    *H04L 29/08* (2006.01)
    *H04L 29/06* (2006.01)

(52) U.S. Cl.
    CPC ............ *H04L 67/42* (2013.01); *H04L 69/163* (2013.01); *H04L 69/16* (2013.01)

(56) References Cited

U.S. PATENT DOCUMENTS

| | | | |
|---|---|---|---|
| 5,742,762 A | 4/1998 | Scholl et al. | |
| 5,748,489 A | 5/1998 | Beatty et al. | |
| 5,790,789 A | 8/1998 | Suarez | |
| 5,892,913 A | 4/1999 | Adiga et al. | |
| 5,894,554 A | 4/1999 | Lowery et al. | |
| 5,937,388 A | 8/1999 | Davis et al. | |
| 6,070,190 A | 5/2000 | Reps et al. | |
| 6,128,277 A | 10/2000 | Bruck et al. | |
| 6,144,990 A | 11/2000 | Brandt et al. | |
| 6,247,109 B1 | 6/2001 | Kleinsorge et al. | |
| 6,249,291 B1 | 6/2001 | Popp et al. | |
| 6,282,697 B1 | 8/2001 | Fables et al. | |
| 6,320,520 B1 | 11/2001 | Luby | |
| 6,470,346 B2 | 10/2002 | Morwood | |
| 6,484,224 B1 | 11/2002 | Robins et al. | |
| 6,564,240 B2 | 5/2003 | Waldo et al. | |
| 6,665,701 B1 * | 12/2003 | Combs .................. | G06F 9/5011 709/200 |
| 6,766,348 B1 * | 7/2004 | Combs .................. | G06F 9/5083 709/226 |
| 7,035,933 B2 | 4/2006 | O'Neal et al. | |
| 7,043,225 B1 * | 5/2006 | Patel ...................... | H04L 12/14 455/404.2 |
| 7,069,295 B2 | 6/2006 | Sutherland et al. | |
| 7,197,547 B1 | 3/2007 | Miller et al. | |
| 7,363,346 B2 | 4/2008 | Groner et al. | |
| 7,379,959 B2 | 5/2008 | Hinni et al. | |
| 7,676,599 B2 * | 3/2010 | Cooney ............... | H04L 67/1008 709/245 |
| 8,060,552 B2 | 11/2011 | Hinni et al. | |
| 8,200,746 B2 | 6/2012 | Hinni et al. | |
| 8,341,209 B2 | 12/2012 | Hinni et al. | |
| 8,682,959 B2 | 3/2014 | Hinni et al. | |
| 9,049,267 B2 | 6/2015 | Hinni et al. | |
| 9,973,376 B2 | 5/2018 | Hinni et al. | |
| 2002/0023117 A1 | 2/2002 | Bemardin et al. | |
| 2002/0152106 A1 * | 10/2002 | Stoxen ............. | G06Q 10/06311 705/7.13 |
| 2002/0162103 A1 | 10/2002 | Boudreault et al. | |
| 2003/0051051 A1 | 3/2003 | O'Neal et al. | |
| 2003/0065656 A1 | 4/2003 | de la Torre et al. | |
| 2006/0117212 A1 | 6/2006 | Meyer et al. | |
| 2006/0198386 A1 | 9/2006 | Liu et al. | |
| 2017/0111208 A1 | 4/2017 | Hinni et al. | |

FOREIGN PATENT DOCUMENTS

| | | |
|---|---|---|
| WO | 2001/61491 A1 | 8/2001 |
| WO | 03/010659 A1 | 2/2003 |

OTHER PUBLICATIONS

"Defendants Amazon.com Inc. and Amazon Web Services, Inc.'s Preliminary Invalidity Contentions"; *Appistry, Inc.* v. *Amazon.com, Inc. and Amazon Web Services, Inc.*; Case 4:2013-cv-02547; filed Eastern District of Missouri, Dec. 20, 2013 (also Case 2:2015-cv-00311 (Western District of Washington)); 461 pages.

Deploying Windows 2000 with IIS 5.0 for Dot Coms: Best Practices, Microsoft (2014).

Distributed Queueing System—3.3.2 User Guide (Dec. 12, 2000).

Distributed Queueing System—3.3x (Dec. 12, 2000).

Dusseau, A. et al, "Effective Distributed Scheduling of Parallel Workloads", ACM (1996).

East, R., et al, "The Architecture of ArcIMS, a Distributed Internet Map Server", Springer Berlin Heidelberg (2001).

Epema, D.H.J., et al, "A Worldwide Flock of Condors: Load Sharing among Workstation Clusters", Esevier B.V. (1996).

Fagg, G.E. et al, "Scalable Networked Information Processing Environment (SNIPE)", Elsevier Science, B.V. (Dec. 14, 1998).

Federal Circuit Judgment re *Appistry, LLC* v. *Amazon.com, Inc. and Amazon Web Services, Inc.*; Case 2:15-cv-00311-MJP issued Feb. 10, 2017; 2 pages.

Federal Circuit Judgment re *Appistry, LLC* v. *Amazon.com, Inc. and Amazon Web Services, Inc.*; Case 2:15-cv-01416-RAJ issued Feb. 10, 2017; 2 pages.

Foster I., and C. Kesselman, "Globus: A Metacomputing Infrastructure Toolkit", International Journal of High Performance Computing Applications (Jun. 1997).

Foster, I., et al, "A Distributed Resource Management Architecture that Supports Advance Reservations and Co-Allocation", IEEE (1999).

Frey, J., et al, "Condor-G: A Computation Management Agent for Multi-Institutional Grids", Kluwer Academic Publishers (Jul. 2002).

Gamache, R. et al, "Windows NT Clustering Service", IEEE (Oct. 1998).

Govil, K. et al, "Cellular Disco: Resource Management Using Virtual Clusters on Shared-Memory Multiprocessors", ACM (Dec. 1999).

Grimshaw, A., et al, "The Legion Vision of a Worldwide Virtual Computer", ACM (Jan. 1997).

Grimshaw, A., et al, "Wide-Area Computing: Resource Sharing on a Large Scale", IEEE (May 1999).

Gruber, B. and K. Rossi, Oracle Webserver User's Guide, Oracle Corp. (1996).

Hariri et al., "Virtual Distributed Computing Environment", Air Force Research Laboratory Information Directorate Rome Research Site—Final Technical Report, Approved for Public Release, Mar. 2000, 51 pages.

Hartman et al., "The Zebra Striped Network File System", Operating System Review, ACM, 1993, pp. 29-43, vol. 27, No. 5., New York, NY.

High Throughput Computing Resource Management, Morgan Kaufmann Publishers (1997).

Internet Information Services 5.0 Technical Overview, Microsoft (2014).

Introduction—Internet Information Services Resource Guide, Microsoft (2014).

Kielmann, T., et al, "Bandwidth-efficient Collective Communication for Clustered Wide Area Systems", IEEE (2000).

Kielmann, T., et al, "MagPle: MPI's Collective Communication Operations for Clustered Wide Area Systems", ACM (1999).

Kielmann, T., et al, MPI's Reduction Operations in Clustered Wide Area Systems (1999).

Kielmann, T., et al, The Albatross Project: Parallel Application Support for Computational Grids (2000).

Kuskin, J. et al, "The Stanford FLASH Multiprocessor", IEEE (1994).

(56) References Cited

OTHER PUBLICATIONS

Litigation Pleadings; *Appistry, Inc.* v. *Amazon.com, Inc. and Amazon Web Services, Inc.*; Case 4:2013-cv-02547; filed Eastern District of Missouri, Dec. 20, 2013 (transferred to Case 2:2015-cv-00311 (Western District of Washington)); 2871 pages.
Litzkow, M.J., et al, "Condor—A Hunter of Idle Workstations", IEEE (1988).
Load Balancing COM+ Components, Microsoft (Mar. 1, 2002).
LSF Administrator's Guide Version 4.1, Platform Computing Corp. (Feb. 2001).
LSF Batch Administrator's Guide, 6th Ed., Platform Computing Corp. (Aug. 1998).
LSF Batch User's Guide, 6th Ed., Platform Computing Corp. (Aug. 1998).
LSF Programmer's Guide Version 12, Platform Computing Corp. (Aug. 1998).
McClure, S. and R. Wheeler, MOSIX: How Linux Clusters Solve Real World Problems (2000).
Microsoft Application Center 2000 Component Load Balancing Technology Overview, Microsoft (Sep. 1, 2000).
Microsoft Cluster Service, Microsoft (Jun. 9, 2001).
Minar, N. et al, "Hive: Distributed Agents for Networking Things", IEEE (Aug. 3, 1999).
Nakada, H. et al, "Design and Implementations of Ninf: towards a Global Computing Infrastructure", Elsevier Science (Oct. 2, 1998).
Nakada, H. et al, "Utilizing the Metaserver Architecture in the Ninf Global Computing System", Springer Berlin Heidelberg (1998).
Network Load Balancing, Windows 2000 Advanced Server, Microsoft (2014).
Neuman, B.C. and S. Rao, "Resource Management for Distributed Parallel Systems", IEEE (Jul. 1993).
Neuman, B.C. and S. Rao, "The Prospero Resource Manager: A scalable framework for processor allocation in distributed systems", John Wiley & Sons, Ltd. (1994).
Newburn, C.J. and J.P. Shen, Automatic Partitioning of Signal Processing Programs for Symmetric Multiprocessors, Parallel Architectures and Compilation Techniques (Oct. 1996).
Nisan, N. et al, "Globally Distributed Computation over the Internet—The Popcorn Project", IEEE (1998).
Oracle 8i Concepts, Oracle Corp. (Dec. 1999).
Oracle 9i Net Services Administrator's Guide, Oracle Corp. (Jun. 2001).
Oracle Internet Application Server 8i Overview Guide, Oracle Corp. (Jul. 2000).
Oracle WebServer 2.0, Oracle Corp. (Mar. 1996).
Petition for Inter Partes Review re U.S. Pat. No. 8,200,746 filed by Amazon.com, Inc. and Amazon Web Services, Inc.; Dec. 22, 2014; 331 pages.
Pfaffenberger, "Script", Webster's New World Computer Dictionary—9th Edition, 3 pages.
Plaat, A. et al, "Sensitivity of Parallel Applications to Large Differences in Bandwidth and Latency in Two-Layer Interconnects", IEEE (1999).
"Plaintiff's Disclosure of Asserted Claims and Preliminary Infringement Contentions"; *Appistry, Inc.* v. *Amazon.com, Inc. and Amazon Web Services, Inc.*; Case 4:2013-cv-02547; filed Eastern District of Missouri, Dec. 20, 2013 (also Case 2:2015-cv-00311 (Western District of Washington)); 314 pages.
Platform Overview, Microsoft (Jun. 9, 2001).
Postel, "Assigned Numbers", RFC 755, May 3, 1979, 12 pages.
Rao, S., Prospero Resource Manager's 1.1 User's Guide (1996).
Regey, O. and N. Nisan, "The Popcorn Market—an Online Market for Computational Resources", ACM (1998).
Roure, D. et al, "The Evolution of the Grid", John Wiley & Sons Ltd. (2003).
Sato, M. et al, "Ninf: A Network based Information Library for Global World-Wide Computing Infrastructure", Springer Berlin Heidelberg (1997).
Smarr, L. and C.E. Catlett, "Metacomputing", ACM (Jun. 1992).
Sun Grid Engine 5.3 and Sun Grid Engine, Enterprise Edition 5.3 Reference Manual, Sun Microsystem, Inc. (Apr. 2002).
Sun Grid Engine 5.3 Manual, Sun Grid Engine, Enterprise Edition 5.3 Manual, Sun Microsystem, Inc., (Jul. 2001).
Sun One Grid Engine and Sun One Grid Engine, Enterprise Edition Reference Manual, Sun Microsystem, Inc. (Oct. 2002).
Sunderam, V.S., "PVM: A Framework for Parallel Distributed Computing", John Wiley & Sons Ltd. (Dec. 1990).
Tamayo, P., et al, "Interpreting Patterns of Gene Expression with Self-Organizing Maps: Methods and Application to Hematopoietic Differentiation", The National Academy of Sciences (1999).
Tanenbaum, A.S. et al, "Experiences with the Amoeba Distributed Operating System", ACM (Dec. 1990).
Tang, H. and T. Yang, "Optimizing Threaded MPI Execution of SMP Clusters", ACM (2001).
Tannenbaum, T., et al, "Condor—A Distributed Job Scheduler", MIT Press (2002).
Tatebe, O., et al, "Grid Datafarm Architecture for Petascale Data Intensive Computing", Asia Pacific Grid (May 23, 2002).
Tatebe, O., et al, "Grid Datafarm Architecture for Petascale Data Intensive Computing", IEEE (2002).
Thain, D., et al, "Distributed Computing in Practice: The Condor Experience", John Wiley & Sons Ltd. (2004).
Thain, D., et al, "Gathering at the Well: Creating Communities for Grid I/O", ACM (2001).
The Buzz About Hive Computing: Putting Peer-to-Peer Computing to Work, Geneer Corp. (2001).
Tygar, J.D. and A. Whitten, "WWW Electronic Commerce and Java Trojan Horses", Usenix (Nov. 1996).
User's Guide, Sun Grid Engine Ch. 3 (Jul. 2001).
van der Aalst, W.M.P., "The Application of Petri Nets to Workflow Management", Journal of Circuits, Systems and Computers (Feb. 1998).
van Nieuwpoort, R. et al, "Wide-Area Parallel Programming Using the Remote Method Invocation Model", John Wiley & Sons Ltd. (1999).
van Nieuwpoort, R., et al, "Efficient Load Balancing for Wide-Area Divide-and-Conquer Applications", ACM (2001).
van Steen, M. et al, "Globe: A Wide-Area Distributed System", IEEE (1999).
Veizades et al, "Service Location Protocol", RFC 2165, Jun. 1997, 72 pages.
Vogels, W. et al, "The Design and Architecture of the Microsoft Cluster Service—A Practical Approach to High-Availability and Scalability", 199x IEEE (Jun. 23-25, 1998).
Vogels, W. et al, Scalability of the Microsoft Cluster Service (Aug. 3-5, 1998).
Web Server Clustering, Microsoft (Jun. 8, 2000).
Weissinger, A.K., ASP in a Nutshell, O'Reilly & Associates, Inc. (1999).
Weissman, J. and A. Grimshaw, "A Federated Model for Scheduling in Wide-Area Systems", IEEE (Aug. 1996).
Windows 2000 Clustering Technologies: Cluster Service Architecture, Microsoft (2014).
Windows 2000 Web and Application Services Technical Overview, Microsoft (2014).
Windows 2000 Web Server Best Practices for High Availability, Microsoft (Oct. 1, 2001).
Windows Clustering Technologies—An Overview, Microsoft (Nov. 1, 2001).
"Defendant's Motion to Dismiss for Invalidity Under 35 U.S.C. 101", *Appistry, LLC* v. *Amazon.com Inc. et al.*, Case No. 2:22015-cv-01416 (Western District of Washington) (re U.S. Pat. Nos. 8,682,959 and 9,049,267), dated Sep. 3, 2015, pp. 1-27.
"Defendant's Reply in Support of Their Motion to Dismiss for Invalidity Under 35 U.S.C. 101", *Appistry, LLC* v. *Amazon.com Inc. et al.*, Case No. 2:22015-cv-01416 (Western District of Washington) (re U.S. Pat. Nos. 8,682,959 and 9,049,267), dated Nov. 13, 2015, pp. 1-18.
"Letter dated Aug. 3, 2016" from Amazon.com Inc. et al. re new case citations, *Appistry, LLC* v. *Amazon.com Inc. et al.*, Case No.

(56) References Cited

OTHER PUBLICATIONS 15-2077 (United States Court of Appeals for the Federal Circuit) (re U.S. Pat. Nos. 8,200,746 and 8,341,209), dated Aug. 3, 2016, pp. 1-3.
"Letter dated Jun. 3, 2016" from Amazon.com Inc. et al. re new case citations, *Appistry, LLC* v. *Amazon.com Inc. et al.*, Case No. 15-2077 (United States Court of Appeals for the Federal Circuit) (re U.S. Pat. Nos. 8,200,746 and 8,341,209), dated Jun. 3, 2016, pp. 1-4.
"Nonconfidential Brief of Defendants-Appellees Amazon.com, Inc. and Amazon Web Services, Inc.", *Appistry, LLC* v. *Amazon.com Inc. et al.*, Case No. 15-2077 (United States Court of Appeals for the Federal Circuit) (re U.S. Pat. Nos. 8,200,746 and 8,341,209), dated May 9, 2016, pp. 1-74.
"Order Granting Defendant's Motion for Judgment on the Pleadings", *Appistry, LLC* v. *Amazon.com Inc. et al.*, Case No. 2:22015-cv-00311 (Western District of Washington) (re U.S. Pat. Nos. 8,200,746 and 8,341,209), dated Jul. 9, 2015, pp. 1-10.
"Order" granting Defendant's Motion to Dismiss under 35 USC 101, *Appistry, LLC* v. *Amazon.com Inc. et al.*, Case No. 2:22015-cv-01416 (Western District of Washington) (re U.S. Pat. Nos. 8,682,959 and 9,049,267), dated Jul. 19, 2016, pp. 1-12.
"Plaintiff Appistry, LLC's Notice of Supplemental Authority", *Appistry, LLC* v. *Amazon.com Inc. et al.*, Case No. 2:22015-cv-01416 (Western District of Washington) (re U.S. Pat. Nos. 8,682,959 and 9,049,267), dated May 16, 2016, pp. 1-3.
"Plaintiff's Complaint", *Appistry, LLC* v. *Amazon.com Inc. et al.*, Case No. 2:22015-cv-01416 (Western District of Washington) (re U.S. Pat. Nos. 8,682,959 and 9,049,267), dated Sep. 3, 2015, pp. 1-28.
"Plaintiff's Opposition to Defendant's Motion to Dismiss for Invalidity Under 35 U.S.C. 101", *Appistry, LLC* v. *Amazon.com Inc. et al.*, Case No. 2:22015-cv-01416 (Western District of Washington) (re U.S. Pat. Nos. 8,682,959 and 9,049,267), dated Nov. 2, 2015, pp. 1-41.
"Plaintiff-Appellant Appistry, Inc.'s Opening Brief", *Appistry, LLC* v. *Amazon.com Inc. et al.*, Case No. 15-2077 (United States Court of Appeals for the Federal Circuit) (re U.S. Pat. Nos. 8,200,746 and 8,341,209), dated Jan. 25, 2016, pp. 1-183.
"Plaintiff-Appellant Appistry, LLC's Reply Brief", *Appistry, LLC* v. *Amazon.com Inc. et al.*, Case No. 15-2077 (United States Court of Appeals for the Federal Circuit) (re U.S. Pat. Nos. 8,200,746 and 8,341,209), dated May 26, 2016, pp. 1-41.
Aberer, K., P-Grid: A Self-Organizing Access Structure for P2P Information Systems, Springer Berlin Heidelberg 2001).
Abramson, D., et al, "A computational economy for grid computing and its implementation in the Nimrod-G resource broker", Elsevier Science B.V. (2002).
Abramson, D., et al, "High Performance Parametric Modeling with Nimrod/G: Killer Application for the Global Grid?", IEEE (2000).
Agrawal, D.P. et al, "Structure of a Parallelizing Complier for the B-HIVE Multicomputer", Elsevier Science B.V. (1988).
Alahakoon, D. et al, "Dynamic Self-Organizing Maps with Controlled Growth for Knowledge Discovery", IEEE (May 2000).
ArcIMS 4 Architecture and Functionality, ESRI (Apr. 2002).
Arnold, D. et al, "Innovations of the NetSolve Grid Computing System", John Wiley & Sons, Ltd. (2002).
Arnold, D. et al, Users' Guide to NetSolve V1.4 (2001).
Bal, H., et al, "The Distributed ASCI Supercomputer Project", ACM (Oct. 2000).
Bal, H., et al, Parallel Computing on Wide-Area Clusters: the Albatross Project (1999).
Barak A. and O. La'adan, The MOSIX multicomputer operating system for high performance cluster computing, Elsevier Science B.V. (1998).
Barak, A., et al, Scalable Cluster Computing with MOSIX for LINUX (1999).
Belloum, A. et al, JERA: A Scalable Web Server (1998).
Belloum, A. et al, Scalable Federations of Web Caches (Nov. 8, 1999).
Beranek et al., "Host Access Protocol Specification", RFC 907, Jul. 1984, 79 pages.
Bernardt, G. et al, "A survey of load sharing in networks of workstations", The British Computer Society, The Institution of Electrical Engineers and IOP Publishing Ltd. (1993).
Breshears, C.P. and G. Fagg, "A Computation Allocation Model for Distributed Computing Under MPI_Connect", CEWES/Major Shared Resource Center/Department of Defense (Apr. 15, 1999).
Bugnion, E. et al, "Disco: Running Commodity Operating Systems on Scalable Multiprocessors", ACM (Nov. 1997).
Buyya, R., Chapter 1—Economic-based Distributed Resource Management and Scheduling for Grid Computing (Apr. 12, 2002).
Buyya, R., et al, "Nimrod/G: An Architecture for a Resource Management and Scheduling System in a Global Computational Grid", IEEE (May 2000).
Buyya, R., The Nimrod-G Grid Resource Broker and Economic Scheduling Algorithms (Apr. 12, 2002).
Capello, F., et al, "HiHCoHP—Toward a Realistic Communication Model for Hierarchical HyperClusters of Heterogeneous Processors", IEEE (2001).
Cardellini et al., "Geographic Load Balancing for Scalable Distributed Web Systems", 9 pages.
Casanova, H and J. Dongarra, "NetSolve: A Network Server for Solving Computational Science Problems", IEEE (1996).
Chapin, J. et al, "Hive: Fault Containment for Shared-Memory Multiprocessors", ACM (Dec. 1995).
Chapin, J., "Hive: Operating System Fault Containment for Shared-Memory Multiprocessors", Stanford University (Jul. 1997).
Chapter 1—Overview of Internet Information Services 5.0, Microsoft (2014).
Chapter 2—Core IIS Administration, Microsoft (2014).
Chapter 6—Developing Web Applications, Microsoft (2014).
Chapter 7—Data Access and Transactions, Microsoft (2014).
Cole, G. et al, "Initial Operating Capability for the Hypercluster Parallel-Processing Test Bed", NASA (Mar. 6-8, 1989).
Components and Web Application Architecture, Microsoft (2014).
Couloirs et al., "Distributed Shared Memory", Distributed Systems Concepts and Design, 2001, pp. 635-667, Third Edition, Ch. 16, Addison-Wesley Publishers.
Couloirs et al., "Distributed Transactions", Distributed Systems Concepts and Design, 2001, pp. 515-552, Third Edition, Ch. 13, Addison-Wesley Publishers.
Couloirs et al., "Replication", Distributed Systems Concepts and Design, 2001, pp. 553-606, Third Edition, Ch. 14, Addison-Wesley Publishers.
Coulouris et al., "Distributed Systems Concepts and Design", 2001, pp. 515-552, Third Edition, Chapter 13, Pearson Education Limited.
Coulouris et al., "Distributed Systems Concepts and Design", 2001, pp. 553-606, Third Edition, Chapter 14, Pearson Education Limited.
Czajkowski et al., "A Resource Management Architecture for Metacomputing Systems", 1998, Springer Berlin Heidelberg, 19 pages.

\* cited by examiner

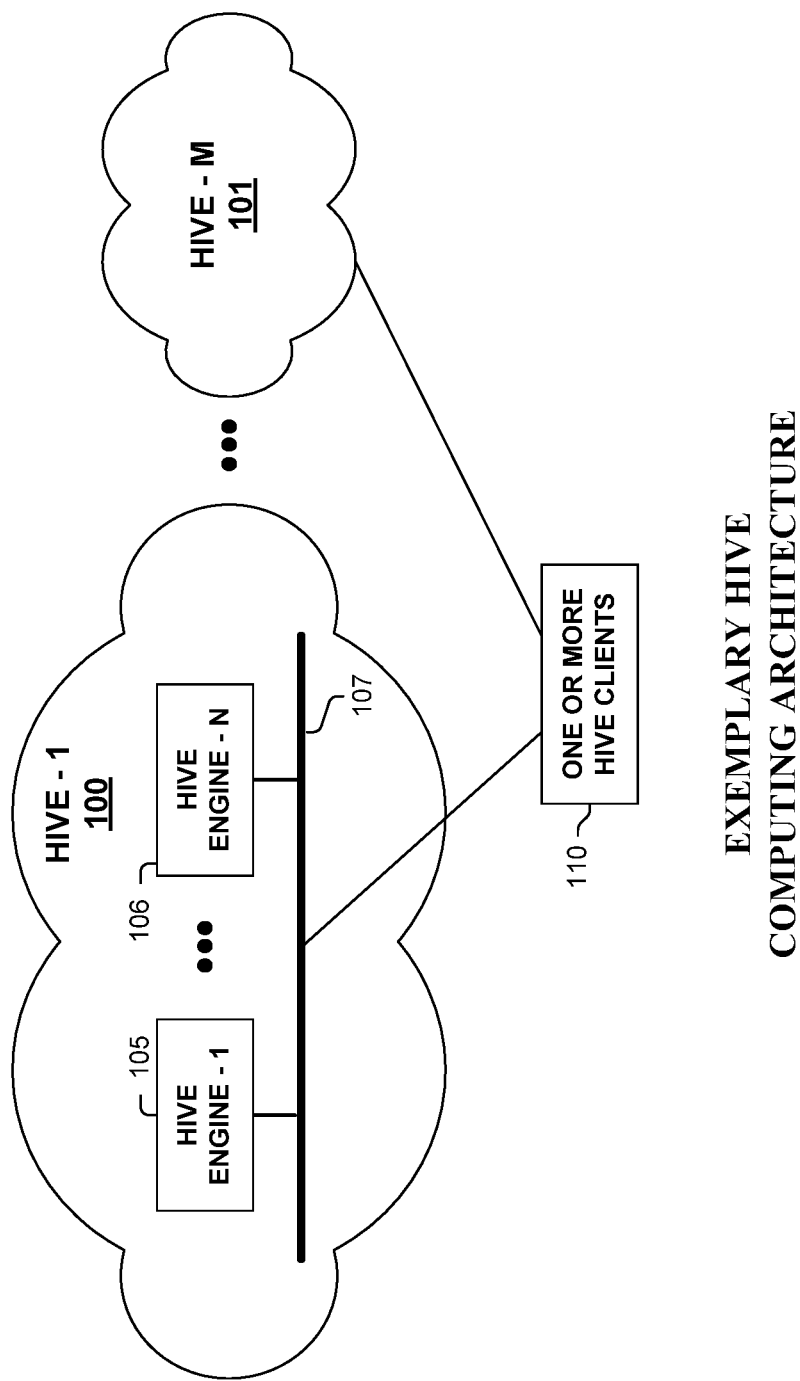

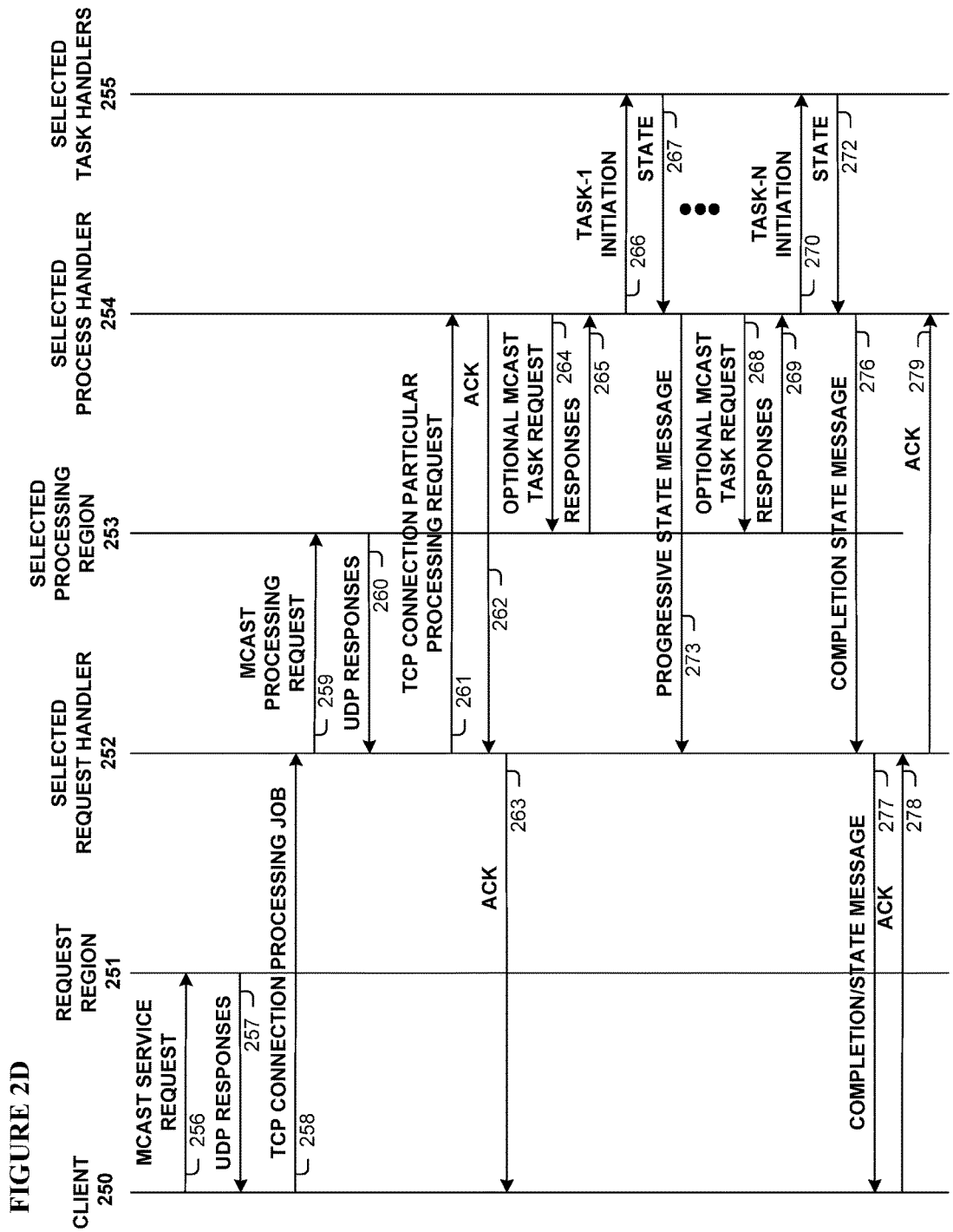

CLIENT PROCESSING

REQUEST HANDLER RESPONSE PROCESSING

SELECTED REQUEST HANDLER JOB PROCESSING

PROCESS HANDLER
RESPONSE PROCESSING

SELECTED PROCESS HANDLER PROCESSING

TASK HANDLER PROCESSING

RECOVERY LAYER PROCESSING

620

```
<?XML VERSION='1.0'?>
<!DOCTYPE process SYSTEM 'ProcessDefinition.dtd'>
<process id='doProcessOne'>
    <state id='start'>
        <task id='task1' retries='1' timeout='1'/>
        <arc task-status='complete' next-state='newProcess'/>
        <arc task-status='not-complete' next-state='bazState'/>
        <arc task-status='not-attempted' next-state='finish'/>
    </state>
    <state id='bazState' snapshot='true'>
        <task id='bazState' retries='3' timeout='1'/>
        <arc task-status='complete' next-state='finish'/>
        <arc task-status='not-complete' next-state='errorState'/>
        <arc task-status='not-attempted' next-state='finish'/>
    </state>
    <state id='errorState'>
        <task id='error/>
        <arc task-status='complete' next-state='finish'/>
    </state>
    <state id='newProcess' snapshot='false'>
        <sub-process='doStuff'/>
        <arc task-status='complete' next-state='finish'/>
        <arc task-status='not-complete' next-state='errorState'/>
        <arc task-status='not-attempted' next-state='finish'/>
    </state>
    </state>
</process>
```

621 → state id='start' block
622 → state id='bazState' block
623 → state id='errorState' block
624 → state id='newProcess' block

FIGURE 6B

EXEMPLARY PROCESS FLOW PROCESSING

HEARTBEAT LEADER

HEARTBEAT MEMBER

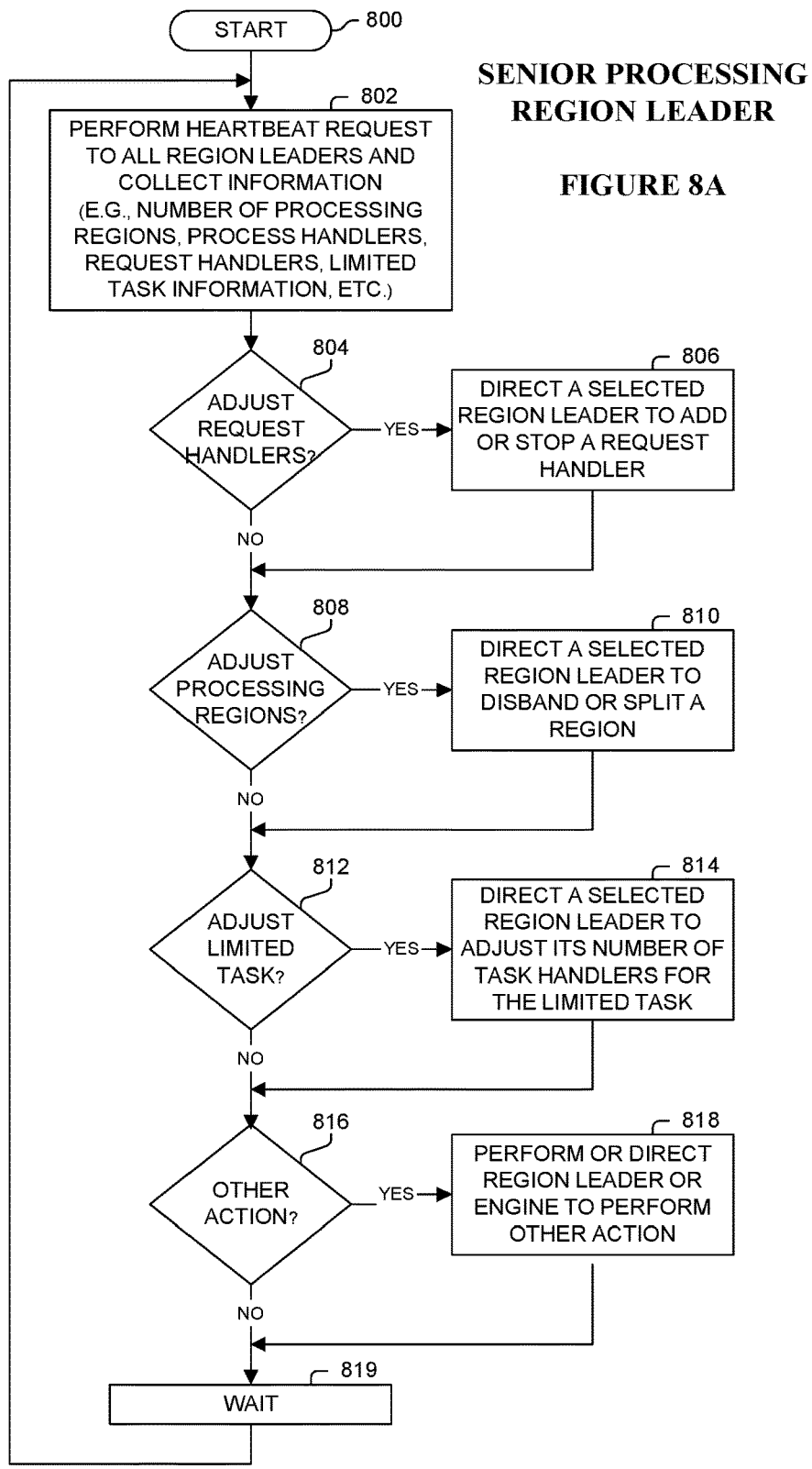

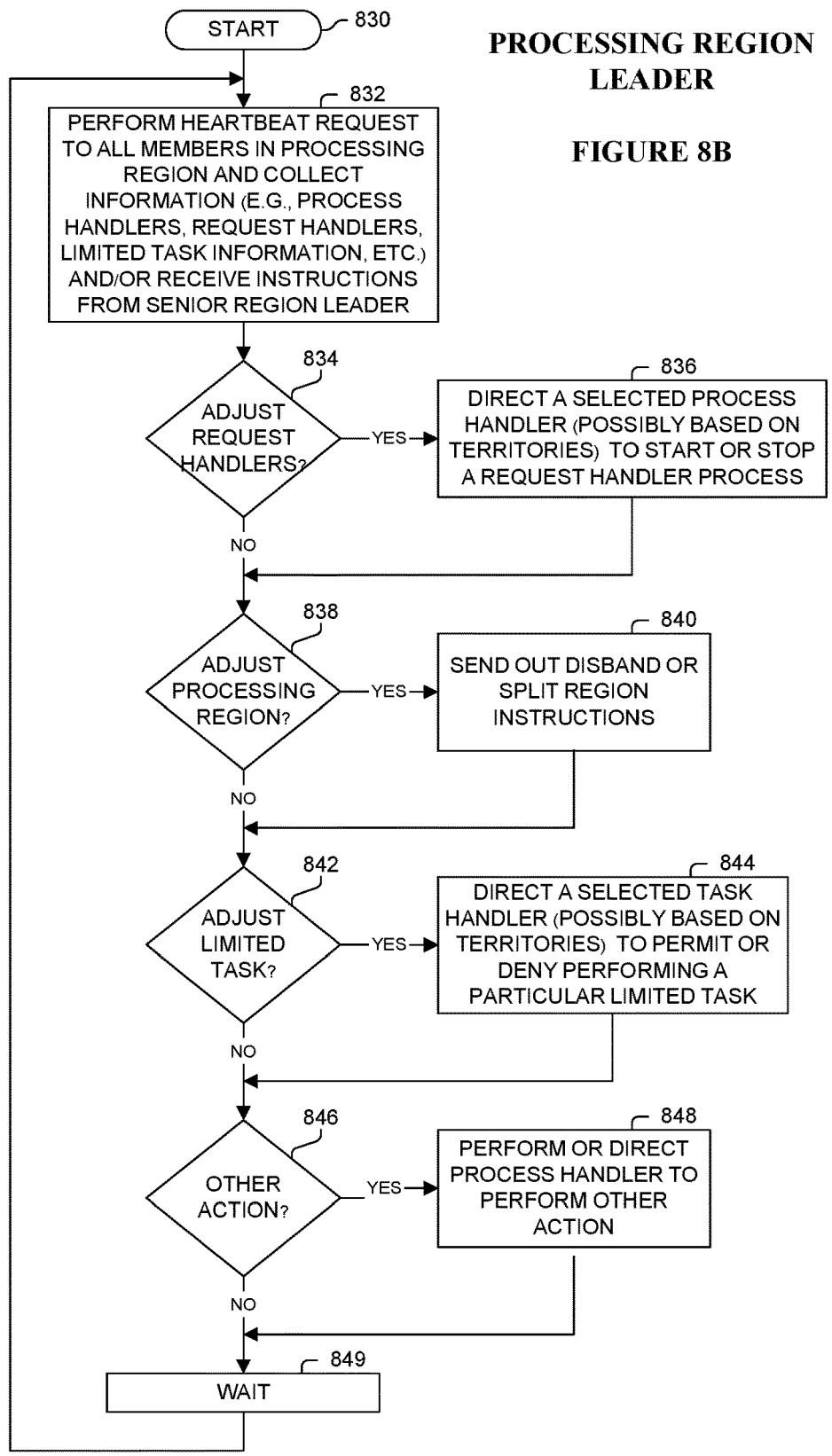

REGION SPLITTING

STARTUP PROCESS

SYSTEM AND METHOD FOR PROCESSING INFORMATION VIA NETWORKED COMPUTERS INCLUDING REQUEST HANDLERS, PROCESS HANDLERS, AND TASK HANDLERS

CROSS-REFERENCE AND PRIORITY CLAIM TO RELATED APPLICATIONS

This is a continuation of nonprovisional application Ser. No. 15/391,577, filed Dec. 27, 2016, now U.S. Pat. No. 9,973,376, which is a continuation of nonprovisional application Ser. No. 14/722,963, filed May 27, 2015, now U.S. Pat. No. 9,544,362, which is a continuation of nonprovisional application Ser. No. 14/176,378, filed Feb. 10, 2014, now U.S. Pat. No. 9,049,267, which is a continuation of nonprovisional application Ser. No. 13/707,861, filed Dec. 7, 2012, now U.S. Pat. No. 8,682,959, which is a continuation of nonprovisional application Ser. No. 13/491,893, filed Jun. 8, 2012, now U.S. Pat. No. 8,341,209, which is a continuation of nonprovisional application Ser. No. 13/293,527, filed Nov. 10, 2011, now U.S. Pat. No. 8,200,746, which is a divisional of nonprovisional application Ser. No. 12/127,070, filed May 27, 2008, now U.S. Pat. No. 8,060,552, which is a divisional of nonprovisional application Ser. No. 10/236,784, filed Sep. 7, 2002, now U.S. Pat. No. 7,379,959, the entire disclosure of which being hereby incorporated by reference in its entirety.

FIELD OF THE INVENTION

This invention especially relates to processing of information including, but not limited to transactional processing using multiple networked computing systems; and more particularly, the invention relates to processing information using a hive of computing engines, typically including request handlers and process handlers.

INTRODUCTION

Many businesses are demanding faster, less expensive, and more reliable computing platforms. Brokerage houses, credit card processors, telecommunications firms, as well as banks are a few examples of organizations that require tremendous computing power to handle a countless number of small independent transactions. Currently, organizations that require these systems operate and maintain substantial servers. Further, the cost associated with these machines stems not only from the significant initial capital investment, but the continuing expense of a sizeable labor force dedicated to maintenance.

When it comes to mission-critical computing, businesses and other organizations face increasing pressure to do more with less. On one hand, they must manage larger transaction volumes, larger user populations, and larger data sets. They must do all of this in an environment that demands a renewed appreciation for the importance of reliability, fault tolerance, and disaster recovery. On the other hand, they must satisfy these growing requirements in a world of constrained resources. It is no longer an option to just throw large amounts of expensive hardware, and armies of expensive people, at problems. The challenge businesses face is that, when it comes to platforms for mission-critical computing, the world is fragmented. Different platforms are designed to satisfy different sets of requirements. As a result, businesses must choose between, and trade off, equally important factors.

Currently, when it comes to developing, deploying, and executing mission-critical applications, businesses and other organizations can choose between five alternative platforms. These are mainframes, high-availability computers, UNIX-based servers, distributed supercomputers, and PC's. Each of these approaches has strengths and weaknesses, advantages and disadvantages.

The first, and oldest, solution to the problem of mission-critical computing was the mainframe. Mainframes dominated the early days of computing because they delivered both availability and predictability. Mainframes deliver availability because they are located in extremely controlled physical environments and are supported by large cadres of dedicated, highly-trained people. This helps to ensure they do not fall victim to certain types of problems. However, because they are typically single-box machines, mainframes remain vulnerable to single-point failures. Mainframes deliver predictability because it is possible to monitor the execution and completion of processes and transactions and restart any that fail. However, the limitation of mainframes is that all monitoring code must be understood, written, and/or maintained by the application developer. The problem mainframes run into is that such systems fall short when it comes to three factors of high importance to businesses. First, mainframes tend not to offer high degrees of scalability. The only way to significantly increase the capability of such a system is to buy a new one. Second, because of their demanding nature, mainframes rely on armies of highly-trained support personnel and custom hardware. As a result, mainframes typically are neither affordable nor maintainable.

Developed to address the limitations and vulnerabilities of mainframes, high-availability computers are able to offer levels of availability and predictability that are equivalent to, and often superior to, mainframes. High-availability computers deliver availability because they use hardware or software-based approaches to ensure high levels of survivability. However, this availability is only relative because such systems are typically made up of a limited number of components. High-availability computers also deliver predictability because they offer transaction processing and monitoring capabilities. However, as with mainframes, that monitoring code must be understood, written, and/or maintained by the application developer. The problem with high-availability computers is that have many of the same shortcomings as mainframes. That means that they fall short when it comes to delivering scalability, affordability, and maintainability. First, they are largely designed to function as single-box systems and thus offer only limited levels of scalability. Second, because they are built using custom components, high-availability computers tend not to be either affordable or maintainable.

UNIX-based servers are scalable, available, and predictable but are expensive both to acquire and to maintain. Distributed supercomputers, while delivering significant degrees of scalability and affordability, fall short when it comes to availability. PC's are both affordable and maintainable, but do not meet the needs of businesses and other organizations when it comes to scalability, availability, and predictability. The 1990s saw the rise of the UNIX-based server as an alternative to mainframes and high-availability computers. These systems have grown in popularity because, in addition to delivering availability and predictability, they also deliver significant levels of scalability. UNIX-based servers deliver degrees of scalability because it is possible to add new machines to a cluster and receive increases in processing power. They also deliver availability because they are typically implemented as clusters and thus can survive the failure of any individual node. Finally, UNIX-based servers deliver some degree of predictability. However, developing this functionality can require significant amounts of custom development work.

One problem that UNIX-based servers run into, and the thing that has limited their adoption, is that this functionality comes at a steep price. Because they must be developed and maintained by people with highly specialized skills, they fall short when it comes to affordability and maintainability. For one thing, while it is theoretically possible to build a UNIX-based server using inexpensive machines, most are still implemented using small numbers of very expensive boxes. This makes upgrading a UNIX-based server an expensive and time-consuming process that must be performed by highly-skilled (and scarce) experts. Another limitation of UNIX-based servers is that developing applications for them typically requires a significant amount of effort. This requires application developers to be experts in both the UNIX environment and the domain at hand. Needless to say, such people can be hard to find and are typically quite expensive. Finally, setting up, expanding, and maintaining a UNIX-based server requires a significant amount of effort on the part of a person intimately familiar with the workings of the operating system. This reflects the fact that most were developed in the world of academia (where graduate students are plentiful). However, this can create significant issues for organizations that do not have such plentiful supplies of cheap, highly-skilled labor.

A recent development in the world of mission-critical computing is the distributed supercomputer (also known as a Network of Workstations or "NOW"). A distributed supercomputer is a computer that works by breaking large problems up into a set of smaller ones that can be spread across many small computers, solved independently, and then brought back together. Distributed supercomputers were created by academic and research institutions to harness the power of idle PC and other computing resources. This model was then adapted to the business world, with the goal being to make use of underused desktop computing resources. The most famous distributed supercomputing application was created by the Seti@Home project. Distributed supercomputers have grown in popularity because they offer both scalability and affordability. Distributed supercomputers deliver some degree of scalability because adding an additional resource to the pool usually yields a linear increase in processing power. However that scalability is limited by the fact that communication with each node takes place over the common organizational network and can become bogged down. Distributed supercomputers are also relatively more affordable than other alternatives because they take advantage of existing processing resources, be they servers or desktop PC's.

One problem distributed supercomputers run into is that they fall short when it comes to availability, predictability, and maintainability. Distributed supercomputers have problems delivering availability and predictability because they are typically designed to take advantage of non-dedicated resources. The problem is that it is impossible to deliver availability and predictability when someone else has primary control of the resource and your application is simply completing its work when it gets the chance. This makes distributed supercomputers appropriate for some forms of off-peak processing but not for time-sensitive or mission-critical computing. Finally, setting up, expanding, and maintaining a distributed supercomputer also requires a significant amount of effort because they tend to offer more of a set of concepts than a set of tools. As a result, they require significant amounts of custom coding. Again, this reflects the fact that most were developed in the world of academia where highly trained labor is both cheap and plentiful.

PC's are another option for creating mission-critical applications. PC's have two clear advantages relative to other solutions. First, PC's are highly affordable. The relentless progress of Moore's law means that increasingly powerful PC's can be acquired for lower and lower prices. The other advantage of PC's is that prices have fallen to such a degree that many people have begun to regard PC's as disposable. Given how fast the technology is progressing, in many cases it makes more sense to replace a PC than to repair it. Of course, the problem with PC's is that they do not satisfy the needs of businesses and other organizations when it comes to scalability, availability, and predictability. First, because PC's were designed to operate as stand-alone machines, they are not inherently scalable. Instead, the only way to allow them to scale is to link them together into clusters. That can be a very time-consuming process. Second, PC's, because they were designed for use by individuals, were not designed to deliver high levels of availability. As a result, the only way to make a single PC highly available is through the use of expensive, custom components. Finally, PC's were not designed to handle transaction processing and thus do not have any provisions for delivering predictability. The only way to deliver this functionality is to implement it using the operating system or an application server. The result is that few organizations even consider using PC's for mission-critical computing.

In a dynamic environment, it is important to be able to find available services. Service Location Protocol, RFC 2165, June 1997, provides one such mechanism. The Service Location Protocol provides a scalable framework for the discovery and selection of network services. Using this protocol, computers using the Internet no longer need so much static configuration of network services for network based applications. This is especially important as computers become more portable, and users less tolerant or able to fulfill the demands of network system administration. The basic operation in Service Location is that a client attempts to discover the location of a Service. In smaller installations, each service will be configured to respond individually to each client. In larger installations, services will register their services with one or more Directory Agents, and clients will contact the Directory Agent to fulfill requests for Service Location information. Clients may discover the whereabouts of a Directory Agent by preconfiguration, DHCP, or by issuing queries to the Directory Agent Discovery multicast address.

The following describes the operations a User Agent would employ to find services on the site's network. The User Agent needs no configuration to begin network interaction. The User Agent can acquire information to construct predicates which describe the services that match the user's needs. The User Agent may build on the information received in earlier network requests to find the Service Agents advertising service information.

A User Agent will operate two ways. First, if the User Agent has already obtained the location of a Directory Agent, the User Agent will unicast a request to it in order to resolve a particular request. The Directory Agent will unicast a reply to the User Agent. The User Agent will retry a request to a Directory Agent until it gets a reply, so if the Directory Agent cannot service the request (say it has no information) it must return an response with zero values, possibly with an error code set.

Second, if the User Agent does not have knowledge of a Directory Agent or if there are no Directory Agents available on the site network, a second mode of discovery may be used. The User Agent multicasts a request to the service-specific multicast address, to which the service it wishes to locate will respond. All the Service Agents which are listening to this multicast address will respond, provided they can satisfy the User Agent's request. A similar mechanism is used for Directory Agent discovery. Service Agents which have no information for the User Agent MUST NOT respond.

While the multicast/convergence model may be important for discovering services (such as Directory Agents) it is the exception rather than the rule. Once a User Agent knows of the location of a Directory Agent, it will use a unicast request/response transaction. The Service Agent SHOULD listen for multicast requests on the service-specific multicast address, and MUST register with an available Directory Agent. This Directory Agent will resolve requests from User Agents which are unicasted using TCP or UDP. This means that a Directory Agent must first be discovered, using DHCP, the DA Discovery Multicast address, the multicast mechanism described above, or manual configuration. If the service is to become unavailable, it should be deregistered with the Directory Agent. The Directory Agent responds with an acknowledgment to either a registration or deregistration. Service Registrations include a lifetime, and will eventually expire. Service Registrations need to be refreshed by the Service Agent before their Lifetime runs out. If need be, Service Agents can advertise signed URLs to prove that they are authorized to provide the service.

New mechanisms for computing are desired, especially those which may provide a reliable computing framework and platform, including, but not limited to those which might produce improved levels of performance and reliability at a much lower cost than that of other solutions.

SUMMARY

A hive of computing engines, typically including request handlers and process handlers, is used to process information. One embodiment includes a request region including multiple request handlers and multiple processing regions, each typically including multiple process handlers. Each request handler is configured to respond to a client service request of a processing job, and if identified to handle the processing job: to query one or more of the processing regions to identify and assign a particular process handler to service the processing job, and to receive a processing result from the particular process handler. Each of the process handlers is configured to respond to such a query, and if identified as the particular process handler: to service the processing job, to process the processing job, to update said identified request handler with state information pertaining to partial processing of said processing job, and to communicate the processing result to the identified request handler. One embodiment includes multiple task handlers, wherein a process handler assigns a task identified with the processing job to one of task handlers, which performs the task and returns the result. In one embodiment, the selection of a task handler to perform a particular task is determined based on a volunteer pattern initiated by the process handler.

Another exemplary embodiment is a distributed computing method that comprises a decentralized distributed computing network executing a processing job in a distributed manner, wherein the decentralized distributed computing network comprises a plurality of networked computers, the plurality of networked computers comprising a request handler, a plurality of process handlers, and a plurality of task handlers, the process handlers being resident on a plurality of different networked computers, the task handlers being resident on a plurality of different networked computers, the processing job having an associated process flow, the process flow including (i) a plurality of tasks without a specification as to which of the networked computers are to perform the tasks and (ii) logic that defines a relationship between the tasks, wherein the executing step comprises: (1) the request handler receiving a service request for the processing job, (2) the decentralized distributed computing network storing state information for the processing job, (3) at least one process handler among the plurality of process handlers volunteering for servicing the processing job corresponding to the received service request based on its availability for servicing the processing job, the at least one process handler thus being a volunteer process handler, (4) the volunteer process handler (i) analyzing the state information for the processing job to determine whether any tasks in the process flow remain to be performed based on the logic for the process flow, (ii) in response to the state information analysis indicating that a task remains for the process flow, identifying a task from the process flow to be performed, and (iii) in response to the state information analysis indicating that no tasks remain for the process flow, determining that the processing job has been completed, (5) for each of a plurality of the identified tasks, at least one task handler among the plurality of task handlers volunteering for performing that identified task based on it being able to perform that identified task, the at least one task handler thus being a volunteer task handler, (6) each volunteer task handler performing an identified task to generate a task result, and (7) the decentralized distributed computing network storing updated state information for the processing job, the updated stored state information being based on the task results.

Still another exemplary embodiment is a distributed computing method that comprises: (1) providing a decentralized distributed computing network that distributively processes a plurality of processing jobs in accordance with a plurality of process flows that are associated with those processing jobs, the decentralized distributed computing network comprising a plurality of networked computers, wherein a plurality of request handlers, process handlers, and task handlers are deployed across a plurality of the networked computers, and wherein each of a plurality of the process flows comprises (i) a plurality of tasks for that process flow without a specification as to which of the networked computers are to perform the tasks, and (ii) logic that defines a relationship between that process flow's tasks, (2) allocating the networked computers to process the processing jobs in a decentralized manner by (i) a plurality of the process handlers volunteering for servicing the processing jobs based on their availabilities for servicing the processing jobs, and (ii) a plurality of the task handlers volunteering for tasks of the processing jobs based on their being able to perform the tasks, (3) a plurality of the request handlers receiving a plurality of service requests for a plurality of the processing jobs, (4) the decentralized distributed computing network storing state information for the processing jobs corresponding to the received service requests, (5) each a plurality of the volunteer process handlers (i) analyzing (A) the state information for a processing job and (B) the logic for the process flow associated with that processing job to determine whether any tasks remain to be performed for that processing job, (ii) in response to the analysis indicating that a task remains for that processing job, identifying a task to be performed, and (iii) in response to the analysis indicating that no tasks remain for that processing job, determining that that processing job has been completed, (6) each of a plurality of the volunteer task handlers performing an identified task such that a plurality of the volunteer task handlers generate a plurality of task results, and (7) the decentralized distributed computing network storing updated state information for the processing jobs, the updated stored state information being based on the task results.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIG. 1A illustrates an architecture of hives used in one embodiment;

FIG. 2D illustrates the flow of messages between components of one embodiment;

FIG. 6B illustrates a definition of an process flow used in one embodiment;

FIG. 8A is a flow diagram of a senior processing region leader process used in one embodiment;

FIG. 8B is a flow diagram of a processing region leader process used in one embodiment;

DETAILED DESCRIPTION

Figure 1B:
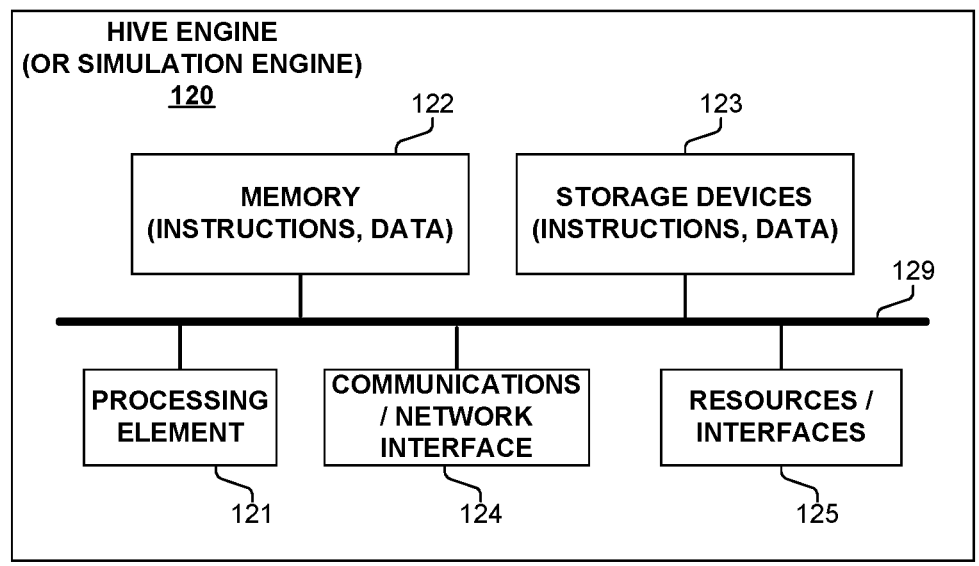
FIG. 1B illustrates a computing platform used for a hive engine for implementing request handlers, process handlers, and/or other processes of a hive of one embodiment, or also used for simulating the operation of a hive in one embodiment.

A hive of computing engines, typically including request handlers and process handlers, is used to process information. Each of the claims individually recites an aspect of the invention in its entirety. Moreover, some embodiments described may include, but are not limited to, inter alia, systems, networks, integrated circuit chips, embedded processors, ASICs, methods, apparatus, and computer-readable medium containing instructions. The embodiments described hereinafter embody various aspects and configurations within the scope and spirit of the invention, with the figures illustrating exemplary and non-limiting configurations.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may be performed in the same or in a different serial or parallel ordering and/or by different components and/or processes, threads, etc., and/or over different connections and be combined with other functions in other embodiments in keeping within the scope and spirit of the invention. Furthermore, the term "identify" is used generically describe any manner or mechanism for directly or indirectly ascertaining something, which may include, but is not limited to receiving, retrieving from memory, determining, calculating, generating, etc.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type, such as, but not limited to a packet.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or identification of a packet. Moreover, these packets may contain one or more types of information, including, but not limited to, voice, data, video, and audio information. The term "item" is used herein to refer to a packet or any other unit or piece of information or data. The phrases "processing a packet" and "packet processing" typically refer to performing some steps or actions based on the packet, and which may or may not include modifying and/or forwarding the packet.

The term "storage mechanism" includes any type of memory, storage device or other mechanism for maintaining instructions or data in any format. "Computer-readable medium" is an extensible term including any memory, storage device, storage mechanism, and any other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, data base, and/or one or more or an organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before the another, but rather provides a mechanism to distinguish between particular units. Additionally, the use of a singular tense of a noun is non-limiting, with its use typically including one or more of the particular item rather than just one (e.g., the use of the word "memory" typically refers to one or more memories without having to specify "memory or memories," or "one or more memories" or "at least one memory", etc.) Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modify or not modifying the coupled signal or communicated information. The term "subset" is used to indicate a group of all or less than all of the elements of a set. Moreover, the term "or" is used herein to identify a selection of one or more, including all, of the conjunctive items.

Numerous means for processing information using a hive of computing/hive engines are disclosed. One implementation includes a request region including multiple request handlers and multiple processing regions, each typically including multiple process handlers. Each request handler is configured to respond to a client service request of a processing job, and if identified to handle the processing job: to query one or more of the processing regions to identify and assign a particular process handler to service the processing job, and to receive a processing result from the particular process handler. As typically used herein, a result corresponds to the outcome of a successfully or unsuccessfully completed job, task or other operation or an error condition, and typically includes one or more indications of a final value or outcome and/or state information (e.g., indications of to the processing performed or not performed, partial or final results, error descriptors, etc.) Each of the process handlers is configured to respond to such a query, and if identified as the particular process handler: to service the processing job, to process the processing job, to update said identified request handler with state information pertaining to partial processing of said processing job, and to communicate the processing result to the identified request handler.

In one embodiment, a volunteer pattern allows a software application (e.g., client process, request handler, process handler, task handler, tasks, or another hive engine process, etc.) to automatically detect a group of software applications on the same network, and to select and communicate with the most appropriate application without any prior knowledge to the location and capabilities of the chosen software application. In one embodiment, messages are sent among processes typically using multicast UDP, unicast UDP, and standard TCP connections.

In one embodiment, the volunteer pattern includes the following steps. First, hive engines that wish to volunteer its capabilities begin by listening for volunteer requests on a known multicast address. Next, a client looking for a request handler to handle its request transmits its needs by issuing a volunteer or service request packet. The service request packet is a small text buffer which includes the type of service it is requesting and any potential parameters of that request. The service request packet also includes the return IP address of the client for hive engines to use to communicate their volunteer responses. The volunteer packet is communicated via multicast to the known multicast group corresponding to the request region. Request handlers of multiple hive engines on the client's network will detect this request. Third, hive engines that receive the service request packet examine its contents. If the hive engine is capable of servicing this request, it responds by sending a response (e.g., a UDP packet) to the client which made the request. The UDP packet typically contains the TCP address of the hive engine's communication port. Unicast UDP packets are used so that only the client that initiated the service request will receive the volunteer responses from the request handlers. Fourth, the client receives unicast UDP packets from the hive engines, selects one, and connects to the hive engine via TCP socket. The client and hive engine will typically use this socket for all subsequent communications during the processing of this application.

In one embodiment, regionalization is used to allow participating hive engines on the same network to detect each other and organize into logical groups of processing regions without any prior configuration to minimize bandwidth usage and CPU consumption in the entire system. Regionalization provides an automated mechanism that allows these processing regions grow and split as needed, which may provide for an unlimited growth of a hive. Thus, volunteer requests (e.g., processing requests, task requests, etc.) can be within a processing region without affecting all hive engines sending these requests or other communications using a multicast address assigned to a specific processing region. This places a bound on the number of responses to be generated (e.g., by the number of hive engines in a processing region.)

Typically, hive engines participate in an automated self-organization mechanisms, which allows participating hive engines on the same local or wide area network to detect each other and organize into logical groups without any prior configuration. However, an embodiment may use any mechanism for defining a regionalization, or even one embodiment does not use regionalization. For example, in one embodiment, a hive engine is pre-configured with parameters to define which region or regions in which to participate; while in one embodiment, users or a centralized control system is used to specify to one or more hive engines which region or regions in which to participate.

A hive typically has multiple processing regions and a single request region; although, one embodiment includes multiple request regions and one or more processing regions. One way to view a processing region is that it is a set of processes on one or more hive engines for executing processing jobs. In one embodiment, a processing region has a leader that keeps track of the number of hive engines in the region. If the number of hive engines in the region reaches the user defined maximum, the region leader instructs the hive engines in the region to divide into two separate smaller regions. If the number of hive engines in the regions reaches the user defined minimum, the region leader instructs the hive engines in the region to join other regions in the hive.

In one embodiment, the processing regions are self-healing in that if the region leader shuts down for any reason all the region members detect the lack of a region leader. A region member promotes itself to region leader. If a processing region has multiple region leaders, the youngest region leaders demotes themselves back to region members, leaving one region leader.

A request region typically hides that the hive consists of multiple regions and directs the processing load across all the regions. From one perspective, spreading the request region across multiple hive engines provides an increased level of fault tolerance, as these services detect the loss of a connection and rebuild or shutdown as necessary. The hive recovers most failure cases, however, when a request is in an indeterminate state, the request is typically terminated to prevent multiple executions.

In one embodiment, a single senior region leader forms the request region. The senior region leader discovers the region leaders via the volunteer pattern. The senior region leader discovers the size of the request region by asking the region leaders for the number of hive engines in their region that are also members of the request region. If the request region has too many or too few members, the senior region leader directs the region leaders to re-allocate the hive engines to or from the request region. The request region is typically self-healing in that if the senior region leader shuts down for any reason all the region leaders detect the lack of a senior region leader. A region leader promotes itself to senior region leader. If the new senior region leader is not the most senior region leader, the senior region leader demotes itself and the most senior region leader promotes itself to senior region leader. If more than one senior region leader exists, the senior region leaders that are less senior or junior to another senior region leader demotes itself.

In one embodiment, a client processing job is specified in terms of a process flow, typically specifying a set of tasks as well state variables typically before and after each task for storing state information. The hive process flow contains the information on the sequence of sub-routines to be called, timeout and retry information if the sub-routines fail, and which sub-routine to call next based on the sub-routine's result. Once specified, it is up to the hive software to execute the sub-routines in the process flow. A process flow may described in any manner or format. For example, in one embodiment, a process flow is described in a XML process definition file. The process flow definition file defines the process flow name, the task to be performed, the task's recovery procedure including the timeout limit and retry limit, and the transition from one state to the next state based on the previous task's result.

In order to maintain high-availability and fault tolerance, a client processing job is typically performed using a self-organized, non-administered, network of services across several hive engines that work together to guarantee execution of a request even in the event that any of the individual services or hive engines fail. For example, in one embodiment, a processing job is received by a request handler from a client using the volunteer pattern. The request engine selects a process handler based on pattern. The process handler proceeds to perform the processing job, and at intermediate steps within the process flow, the process handler communicates state information to the request engine, such that the state and progress of the processing job at discrete steps is known by multiple processes, typically on different physical hive engines, and possibly in different territories (which may be defined to be in physically different locations, or using different communications and/or electrical systems, etc.) Thus, should a failure occur, the processing job typically can be resumed by another process handler newly selected by the request handler, or possibly completed by the original process handler with it storing results and/or communicating the results to the client via a different path (e.g., using a different request handler, etc.)

In one embodiment, processing a request typically includes the request setup, request processing, and request teardown. In the request setup, the client submits a request for a volunteer to the request region. A request handler receives the request, opens a TCP connection, and sends a response to the client. The client sends the request over the TCP connection to the request handler. The request handler receives the request and submits a request for a volunteer. A process handler receives the request, opens a TCP connection, and sends a response to the request handler. The request handler receives the response and sends the request over the TCP connection to the process handler. The process handler receives the request and sends an acknowledgement message. The request handler receives the acknowledgement message then sends an acknowledgement message to the client. The client receives the acknowledgement message then sends a process command to the request handler. The request handler receives the process command sends the process command to the process handler. The process handler receives the process command and begins processing the request. If the client loses connection with the request handler during this procedure, the client should perform a retry.

In one embodiment, in the request process procedure, the process handler submits a volunteer request to a processing region. A task handler receives the volunteer request, opens a TCP connection, and sends a response. The process handler receives the volunteer response and sends the first task in the process flow to the task handler over the TCP connection. The task handler processes the task and sends the results to the process handler. If the task does not complete within the specified amount of time and retries are set to zero, the request handler returns an error code as the final result to the request handler. If the task does not complete within the specified amount of time and retries are greater than zero, the request handler resubmits the task to another task handler. If snapshot is enabled on this task or if retries is set to zero, the process handler sends the result to the request handler. This repeats until the next state is finish. When the next state is finish, the process handler sends the final result to the request handler. If the client loses connection with the request handler during this procedure, the client should perform a recover.

In one embodiment, in the request teardown procedure, the request handler sends the final result to the client. The client receives the result and sends an acknowledgement to the request handler. The request handler receives the acknowledgement and sends an acknowledgement to the process handler. If the client loses connection with the request handler during this procedure, the client should perform a recover.

In one embodiment, the task service runs on each worker machine. Task services have an IP address and assigned TCP port on their worker machine. All task services in the Hive share common UDP multicast groups based on their worker machine's current region. On completion of the volunteer pattern for a simple task, the connected TCP socket will be passed off to the task handler. When responding to a volunteer pattern for a daemon task, this service will UDP the daemon task's IP and port to the requester. The service has both task handlers and daemon tasks. Upon receiving a task to execute from a process handler, the service will spin off a task handler or delegate the task to a daemon task, as appropriate. Upon completion of the task, the task handler or daemon task will return the results to the process handler.

One embodiment uses an intra-process recovery which enables the hive to recover from a connection loss between the client and the request handler while the request handler is overseeing the processing of a request. When the client loses the connection with a first request handler, once the request processing has completed the request setup phase, the first request handler continues processing the request and the client submits a request for a new request handler (second request handler). The client issues the recover command and second request handler listens queries the recover service for a user-defined amount of time. If second request handler does not receive the result within the specified amount of time, second request handler returns an error. When first request handler receives the final result, first request handler writes the final result to the recover service.

One embodiment operates slightly differently as multiple process handlers are used for each step in a process flow. For example, both process handlers typically maintain the current state of the request such that if either of the process handlers is lost, the other picks up in its place. If the request handler is lost, the client and/or process handlers can establish a new request handler. The request handler manages the interface between software requesting processing from the hive and the hive. A primary process handler is a service that walks a request through the steps and recovery defined in a process flow. A secondary process handler is a service that monitors the primary process handler. If something happens to the primary process handler, the secondary process handler continues going through the steps and recovery defined in a process flow. A task handler is a service that performs the sub-routine defined in the process flow.

For example, in one embodiment, first, a request handler finds two process handlers. The request handler designates one as the primary process handler and the other as the secondary process handler. Next, the request handler sends the primary process handler the secondary process handler's IP address and sends the secondary process handler the primary process handler's IP address. The primary process handler and secondary process handler open a TCP port for communication then send acknowledgement messages to the request handler. The primary process handler finds a task handler. The task handler opens a TCP port and sends the request to the primary process handler. The primary process handler prepares the initial process flow state and sends that state to the secondary process handler. The secondary process handler and the request handler monitor the task states over the TCP connection. The task handler processes the request, sends the result to the primary process handler.

One embodiment provides an assimilation mechanism which recognizes new hive engines trying to join a hive. These steps occur without stopping execution of the entire hive, and the hive updates its hive engines in a measured rate to ensure that portions of the hive are continually processing requests ensuring constant availability of the hive applications.

In one embodiment, when a new hive engine joins the hive, the new hive engine finds the operating system image and the base hive software via DHCP. The new hive engine self installs the OS image and hive software using automated scripts defined by client. If a hive engine has an old version of the OS, the region leader makes the hive engine unavailable for processing. The hive engine is erased and rebooted. The hive engine then joins the hive as a new hive engine and re-installs the OS and hive software accordingly.

In addition, in one embodiment, when a hive engine joins the hive, the hive engine sends a request to the region leader. The hive engine receives a response from the region leader and selects a region to join. The region leader queries the hive engine for information about services, software, and versions. If the region leader is running a newer version of the hive system, the region leader makes the hive engine unavailable for processing. The region leader updates the hive engine by transmitting the current version of the hive system. The hive engine installs the update and commences processing. If the hive engine is running a newer version of hive system than the region leader, the region leader makes itself unavailable for process, receives the newer version of the hive system from the hive engine, installs the software, and continues processing. Once the region leader is updated, the region leader begins updating its region's members and the other region leaders. For example, in one embodiment, a hive engine then receives a response from the region leaders and selects a region to join. The region leader queries the hive engine for information about services, software, and versions. If the region leader is running the most current version of the hive applications, the region leader automatically updates the hive engine's hive applications. If the hive engine is running the most current version of the hive applications, the region leader automatically updates its hive applications. Once the region leader is updated, the region leader begins updating its region's members and the other region leaders.

Turning to the figures, FIG. 1A illustrates an architecture of hives used in one embodiment. Shown are multiple hives 100-101. A hive 100-101 is a logical grouping of one or more hive engines (e.g., computers or other computing devices) networked together to perform processing resources to one or more hive clients 110. For example, hive 100 includes multiple hive engines 105-106 connected over a network (or any communication mechanism) 107.

In one embodiment, a hive is a decentralized network of commodity hardware working cooperatively to provide vast computing power. A hive typically provides high-availability, high-scalability, low-maintenance, and predictable-time computations to applications (e.g., those corresponding to processing jobs of clients) executed in the hive. Each hive engine in the hive is typically capable to individually deploy and execute hive applications. When placed on the same network, hive engines seek each other out to pool resources and to add availability and scalability.

FIG. 1B illustrates a computing platform used for a hive engine for implementing request handlers, process handlers, and/or other processes of a hive as used in one embodiment (or also used for simulating the operation of one or more elements of a hive in one embodiment). As shown, hive engine 120 is configured to execute request handlers, process handler, and other hive processes, and to communicate with clients and other hive engines as discussed herein.

In one embodiment, hive engine 120 includes a processing element 121, memory 122, storage devices 123, communications/network interface 124, and possibly resources/interfaces (i.e., to communicate to other resources) which may be required for a particular hive application (e.g., specialized hardware, databases, I/O devices, or any other device, etc.) Elements 121-125 are typically coupled via one or more communications mechanisms 129 (shown as a bus for illustrative purposes). Various embodiments of hive engine 120 may include more or less elements. The operation of hive engine 120 is typically controlled by processing element 121 using memory 122 and storage devices 123 to perform one or more hive processes, hive tasks, or other hive operations according to the invention. Memory 122 is one type of computer-readable medium, and typically comprises random access memory (RAM), read only memory (ROM), flash memory, integrated circuits, and/or other memory components. Memory 122 typically stores computer-executable instructions to be executed by processing element 121 and/or data which is manipulated by processing element 121 for implementing functionality in accordance with the invention. Storage devices 123 are another type of computer-readable medium, and typically comprise solid state storage media, disk drives, diskettes, networked services, tape drives, and other storage devices. Storage devices 123 typically store computer-executable instructions to be executed by processing element 121 and/or data which is manipulated by processing element 121 for implementing functionality in accordance with the invention.

In one embodiment, hive engine 120 is used as a simulation engine 120 to simulate one or more hive engines, and/or one or more hive processes, tasks, or other hive functions, such as, but not limited to those disclosed herein, especially the operations, methods, steps and communication of messages illustrated by the block and flow diagrams and messages sequence charts. Hive simulator engine 120 typically is used to simulate the performance and availability of hive application fabrics. The simulator allows dynamic simulation of any environment using simple text directives or a graphical user interface. For example, hive simulator engine 120 can be used to determine the hive performance using particular computing hardware by specifying such things as the computer type, instantiation parameters, and connection fabric, which is used by hive simulator engine 120 to produce a representation of the performance of a corresponding hive. In one embodiment, multiple hive simulator engines 120 are used, such as a unique three-level, two-dimensional mode connection fabric that allows hive simulator engines 120 to transmit requests uni-directionally or bi-directionally and to access other hive simulator engines 120 for subset processing while processing a request. Thus, one or more hive simulator engines 120 allow for modeling at the software level, hardware level, or both levels. Additionally, a hive simulator engine 120 is typically able to transmit requests through a simulated network or real hive network, such as hive 100 (FIG. 1A).

Figure 2A:
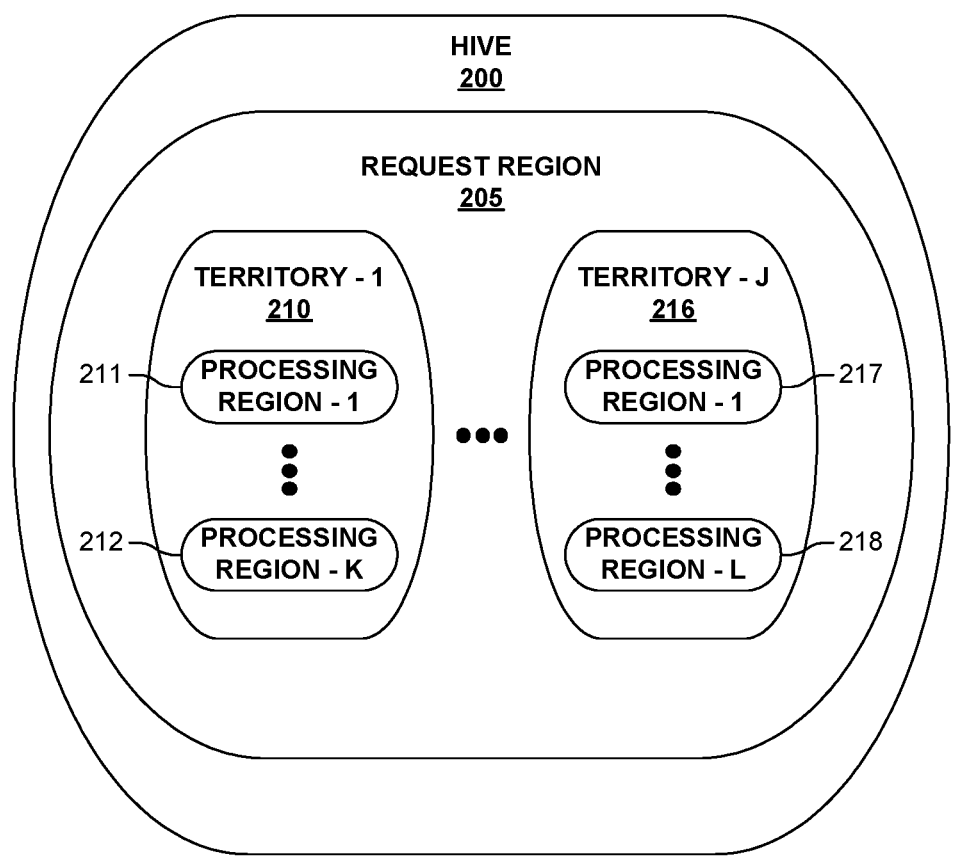
FIG. 2A illustrates a hierarchy of a hive, request regions, territories, and processing regions as used in one embodiment.

FIG. 2A illustrates a hierarchy of a hive, request regions, territories, and processing regions as used in one embodiment. As shown, hive 200 is logically divided into one or more request regions 205 (although most hives use only one request regions), territories 210 and 216, with multiple processing regions 211-212 and 217-218.

The use of territories 210 and 216 provides a mechanism for associating a physical location or quality of a corresponding hive engine which can be used, for example, in determining which responding request or process handlers to select via a volunteer pattern. When defined based on physical location, if performance is the major issue, then it is typically advantageous (but not required) to process all requests within the same territory. If reliability is the major issue, then it is typically advantageous (but not required) store state recover information in another territory.

Figure 2B:
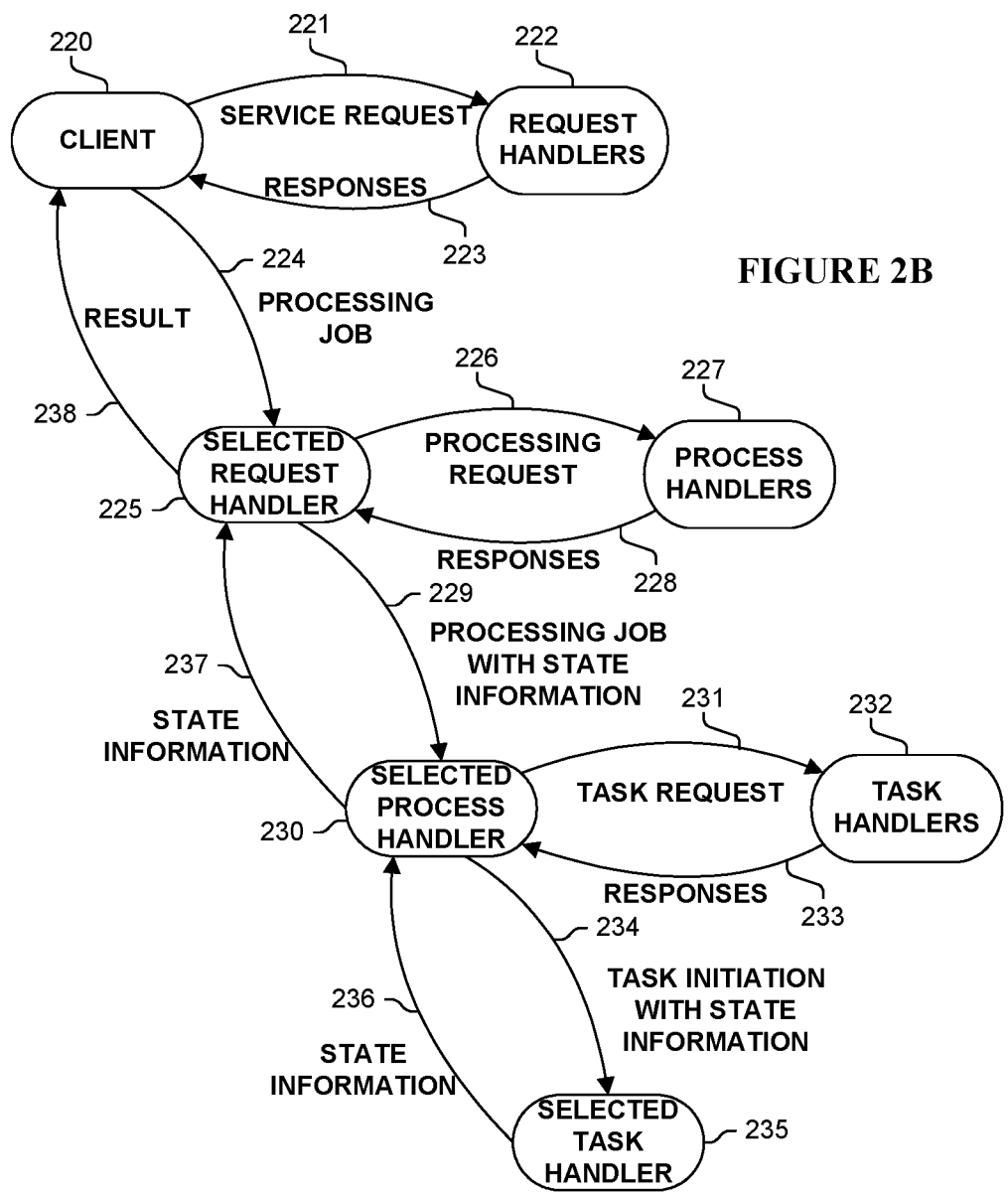
FIG. 2B illustrates an interaction of a client, request handlers, and process handlers of one embodiment.

FIG. 2B illustrates an interaction of a client, request handlers, and process handlers of one embodiment. Client 220 generates a service request 221 to request handlers 222, such as via a request region multicast message, one or more messages, a broadcast message, or other communication mechanisms. Those request handlers 222 that are available to process the request return responses 223 to client 220, typically via a unicast message directly to client 220 which includes a communications port to use should the sending request handler be selected by client 220. Client 220 selects, optionally based on territory considerations, typically one (but possibly more) of the responding request handlers, and communicates processing job 224 to the selected request handler 225.

In response, selected request handler 225 generates a processing request 226 to process handlers 227, such as via one or more processing region multicast messages or other communication mechanisms. Those process handlers 227 that are available to process the request return responses 228 to selected request handler 225, typically via a unicast message directly to selected request handler 225 which includes a communications port to use should the sending request handler be selected by selected request handler 225. Selected request handler 225 selects, optionally based on territory considerations, typically one (but possibly more) of the responding process handlers, and communicates processing job with state information 229 to the selected process handler 230. Inclusion of the state information is emphasized in regards to processing job with state information 229 because the processing job might be ran from the beginning or initialization state, or from an intermittent position or state, such as might happen in response to an error or timeout condition.

In response, selected process handler 230 proceeds to execute the process flow (or any other specified application), and at defined points in the process flow, updates selected request handler 225 with updated/progressive state information 237. Typically based on the process flow, selected process handler 230 will sequentially (although one embodiment allows for multiple tasks or sub-processes to be executed in parallel) cause the tasks or processing requests to be performed within the same hive engine or by other hive engines.

In one embodiment, selected process handler 230 selects a hive engine to perform a particular task using a volunteer pattern. For example, selected process handler 230 sends a multicast task request 231 to task handlers typically within the processing region (although one embodiment, sends task requests 231 to hive engines in one or more processing and/or request regions). Those task handlers 232 able to perform the corresponding task send a response message 233 to selected process handler 230, which selects, possibly based on territory, hive engine (e.g., itself as less overhead is incurred to perform the task within the same hive engine) or other considerations, one of the responding task handlers 232. Selected process handler 230 then initiates the task and communicates state information via message 234 to the selected task handler 235, which performs the task and returns state information 236 to selected process handler 230. If there are more tasks to perform, selected process handler 230 typically then repeats this process such that tasks within a process flow or application may or may not be performed by different hive engines. Upon completion of the application/process flow, selected process handler 230 forwards the final state information (e.g., the result) 237 to selected request handler 225, which in turn, forwards the result and/or other information 238 to client 220.

In one embodiment, selected process handler 230 performs tasks itself or causes tasks to be performed within the hive engine in which it resides (and thus selected task handler 235 is within this hive engine, and one embodiment does not send task request message 231 or it is sent internally within the hive engine.) In one embodiment, selected task handler 235 is a separate process or thread running in the same hive engine as selected process handler 230. Upon completion of the application/process flow, selected process handler 230 forwards the final state information (e.g., the result) 237 to selected request handler 225, which in turn, forwards the result and/or other information 238 to client 220.

Figure 2C:
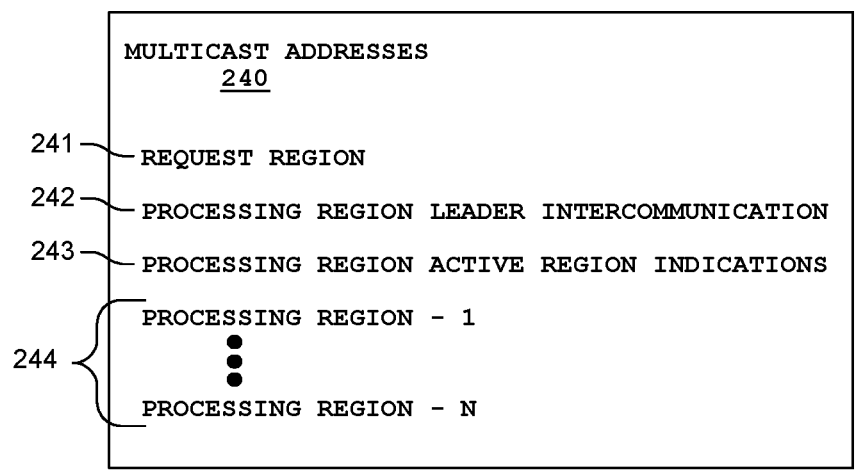
FIG. 2C illustrates multicast addresses used in one embodiment.

FIG. 2C illustrates multicast addresses 240 used in one embodiment. As shown, multicasts addresses 240 includes: a multicast request region address 241 using which a client typically sends a service request message, a processing region leader intercommunication multicast address 242 used for processing region leaders to communicate among themselves, a processing region active region indications multicast address 243 which is typically used to periodically send-out messages by region leaders to indicate which processing regions are currently active, and multiple processing region multicasts addresses 244, one typically for each processing region of the hive. Of course, different sets or configurations of multicast addresses or even different communications mechanisms may be used in one embodiment within the scope and spirit of the invention.

FIG. 2D illustrates the flow of messages among components of one embodiment. Client 250 sends a multicast hive service request message 256 into the request region 251 of the hive. Request handlers available for performing the application corresponding to request 256 respond with UDP messages 257 to client 250, which selects selected request handler 252, one of the responding request handlers. In one embodiment, this selection is performed based on territory or other considerations, or even on a random basis. Client 250 then communicates the processing job in a message 258 over a TCP connection to the selected request handler 252.

In response and using a similar volunteer pattern, selected request handler 252 multicasts a processing request message 259 to a selected processing region 253, and receives UDP response messages 260 from available processing engines to service the request (e.g., perform the processing job). Selected request handler 252 selects selected process handler 254, one of the responding request handlers. In one embodiment, this selection is performed based on territory or other considerations, or even on a random basis. Selected request handler 252 then forwards the processing job with state information in message 261 to selected process handler 254, which returns an acknowledgement message 262. In response, selected request handler 252 sends an acknowledgement message 263 to client 250 (e.g., so that it knows that the processing is about to be performed.)

Selected process handler 254 then causes the processing job to be executed, typically by performing tasks within the same hive engine if possible for optimization reasons, or by sending out one or more tasks (possibly using a volunteer pattern) to other hive engines. Thus, selected process handler 254 optionally sends a multicast task request message 264 typically within its own processing region (i.e., selected processing region 253) (and/or optionally to one or more other processing or request regions), and receives responses 265 indicating available task handlers for processing the corresponding task. Task request message 264 typically includes an indication of the type or name of the task or task processing to be performed so that task handlers/hive engines can use this information to determine whether they can perform the task, and if not, they typically do not send a response message 265 (as it is less overhead than sending a response message indicating the corresponding task handler/hive engine cannot perform the task.) Note, in one embodiment, a task handler within the same hive engine as selected process handler 254 sends a response message 265.

Whether a task handler to perform the first task is explicitly or implicitly determined, selected process handler initiates a first task 266, which is performed by one of one or more individual task threads 255 (which may be the same or different task threads on the same or different hive engines), which upon completion (whether naturally or because of an error or timeout condition), returns state information 272 to selected process handler 254, which in turn updates selected request handler 252 via progressive state message 273. (Note, if there was only one task, then completion/state message 276 would have been sent in response to completion of the task.) This may continue for multiple tasks as indicated by optional MCAST task request and response messages 268-269 and task-n initiation 270 and state messages 272. When processing of the application/process flow is completed as determined by selected process handler 254 in response to state messages from the individual task threads 255, selected process handler 254 forwards a completion and result state information 276 to selected process handler 252, which forwards a result message 277 to client 250. In response, client 250 sends an acknowledgement message 278 to confirm receipt of the result (indicating error recovery operations do not need to be performed), and an acknowledgement message 279 is forwarded to selected process handler 254, and processing of the processing job is complete.

Figure 2E:
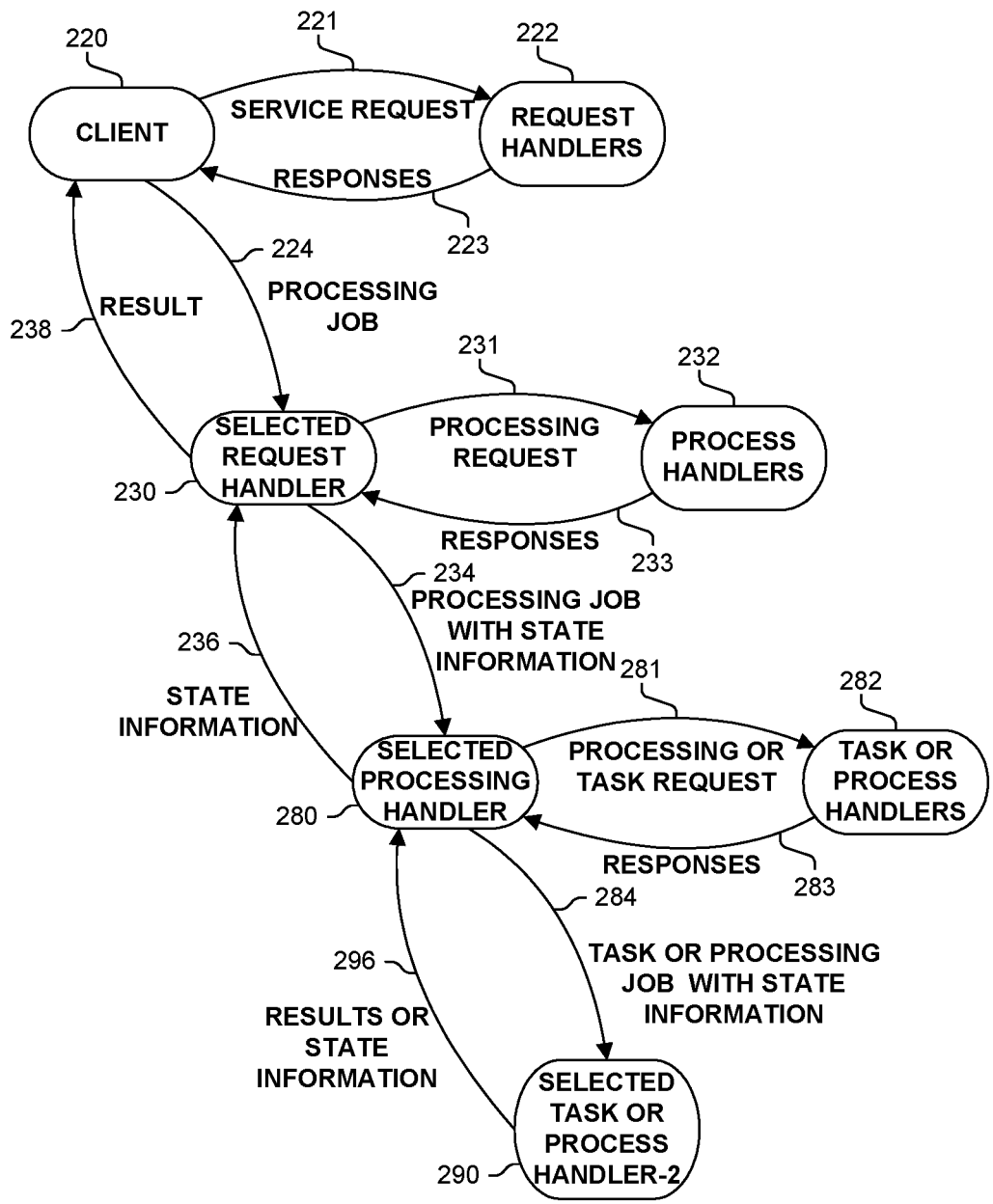
FIG. 2E illustrates an interaction of a client, request handlers, process handlers and possibly tasks of one embodiment.

FIG. 2E illustrates an interaction of a client, request handlers, process handlers and possibly tasks of one embodiment. Many of the processes and much of the flow of information is the same as illustrated in FIG. 2B and described herein, and thus will not be repeated. FIG. 2E is used to emphasize and explicitly illustrate that different embodiments may implement features differently, and to emphasize that a process flow may specify tasks or even other process flows to be performed or the same process flow to be performed recursively.

For example, as shown, selected process handler 230 of FIG. 2B is replaced with selected process handler 280 in FIG. 2E. Selected process handler 280, in response to being assigned to execute the clients processing job by receiving processing job with state information message 229, proceeds to execute the corresponding application/process flow, which may optionally include performing a volunteer pattern using processing or task request messages 281 and response messages 283 to/from one or more task or process handlers 282. In response to the volunteer operation or directly in response to receiving the processing job with state information message 229, selected process handler 280 will sequentially (although one embodiment allows for multiple tasks or sub-processes to be executed in parallel) perform itself or send out tasks or processing requests to corresponding selected task or process handlers 290, in which case task or processing job with state information messages 284 are typically sent and results or state information messages 296 are typically received. The number of levels used in performing a processing job is unbounded as indicated in FIG. 2E.

Figure 3:
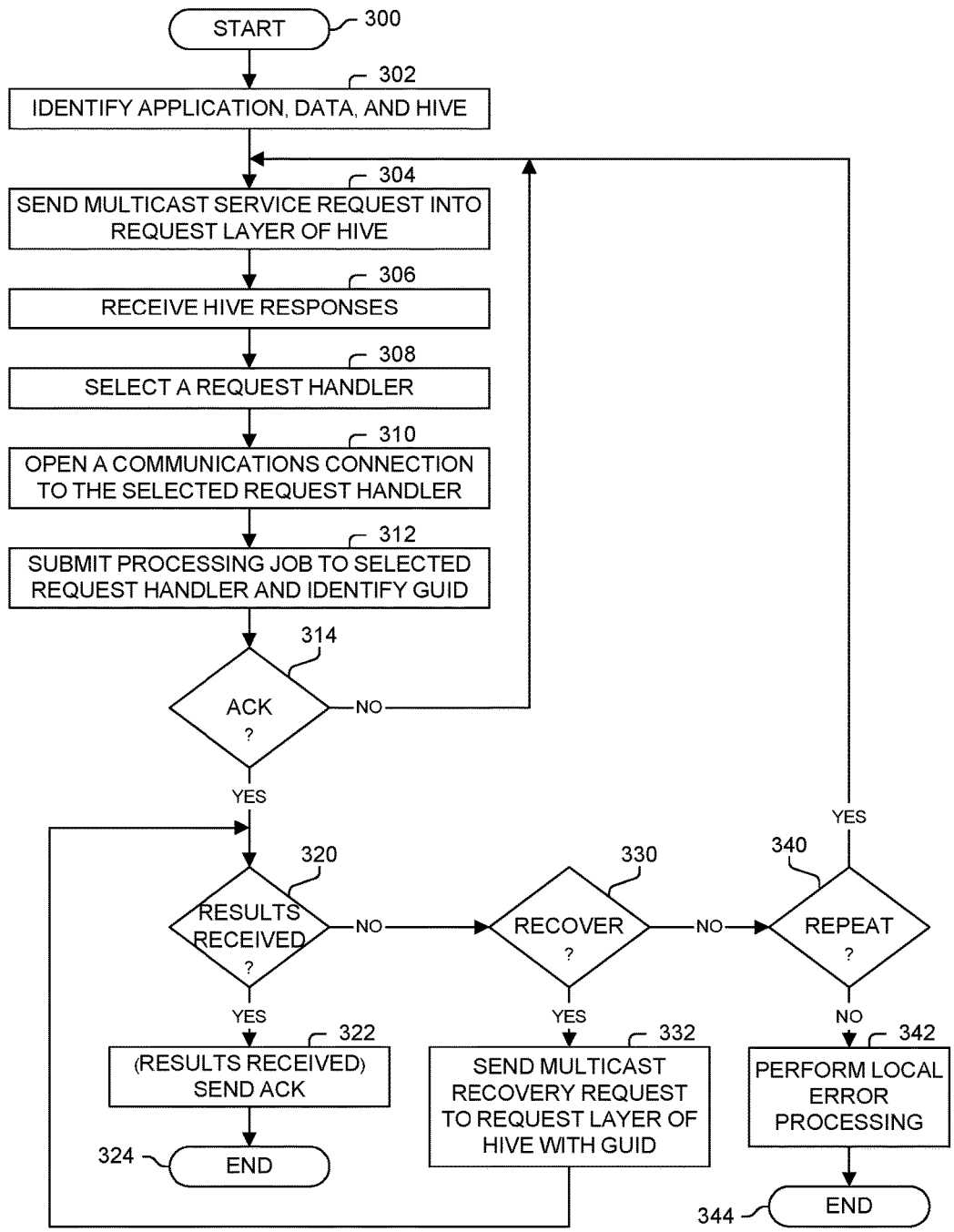
FIG. 3 is a flow diagram of a client process used in one embodiment.

FIG. 3 is a flow diagram of a client process used in one embodiment. Processing begins with process block 300, and proceeds to process block 302, wherein an application, data, and hive to process these is identified. Next, in process block 304, a multicast service request message indicating application is sent into the request layer of the selected hive. In process block 306, responses are received from the hive (if no responses are received, processing returns to process block 302 or 304 in one embodiment). Next, in process block 308, a request handler is selected based on the responses, and a communications connection is established to the selected request handler in process block 310. Next, in process block 312, the processing job is submitted to the selected request handler and a global unique identifier (GUID) is included so that the client and hive can uniquely identify the particular processing job. As determined in process block 314, if an acknowledgement message is not received from the hive indicating the job is being processed within a timeframe, then processing returns to process block 304.

Otherwise, if results are received from the hive within the requisite timeframe as determined in process block 320, then an acknowledgement message is returned to the hive in process block 322, and processing is complete as indicated by process block 324. Otherwise, as determined in process block 330, if the client determines it wishes to perform a recover operation, then in process block 332, a multicast recovery request message specifying the GUID is sent to the request layer of the hive, and processing returns to process block 320 to await the recovery results. Otherwise, as determined in process block 340, if the client determines to again request the job be performed, then processing returns to process block 304. Otherwise, local error processing is optionally performed in process block 342, and processing is complete as indicated by process block 344.

Figure 4A:
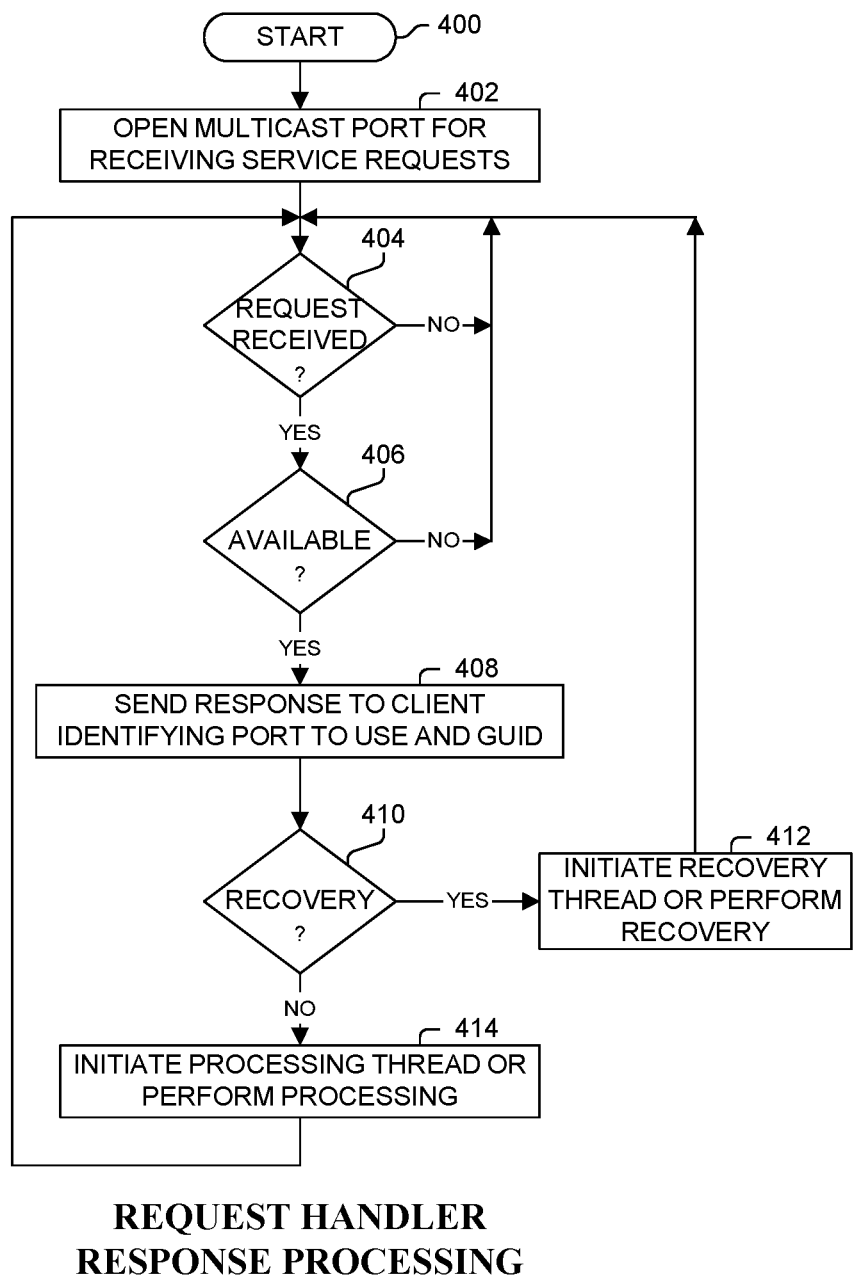
FIGS. 4A-C are flow diagrams of request handler processes used in one embodiment.
Figure 4B:
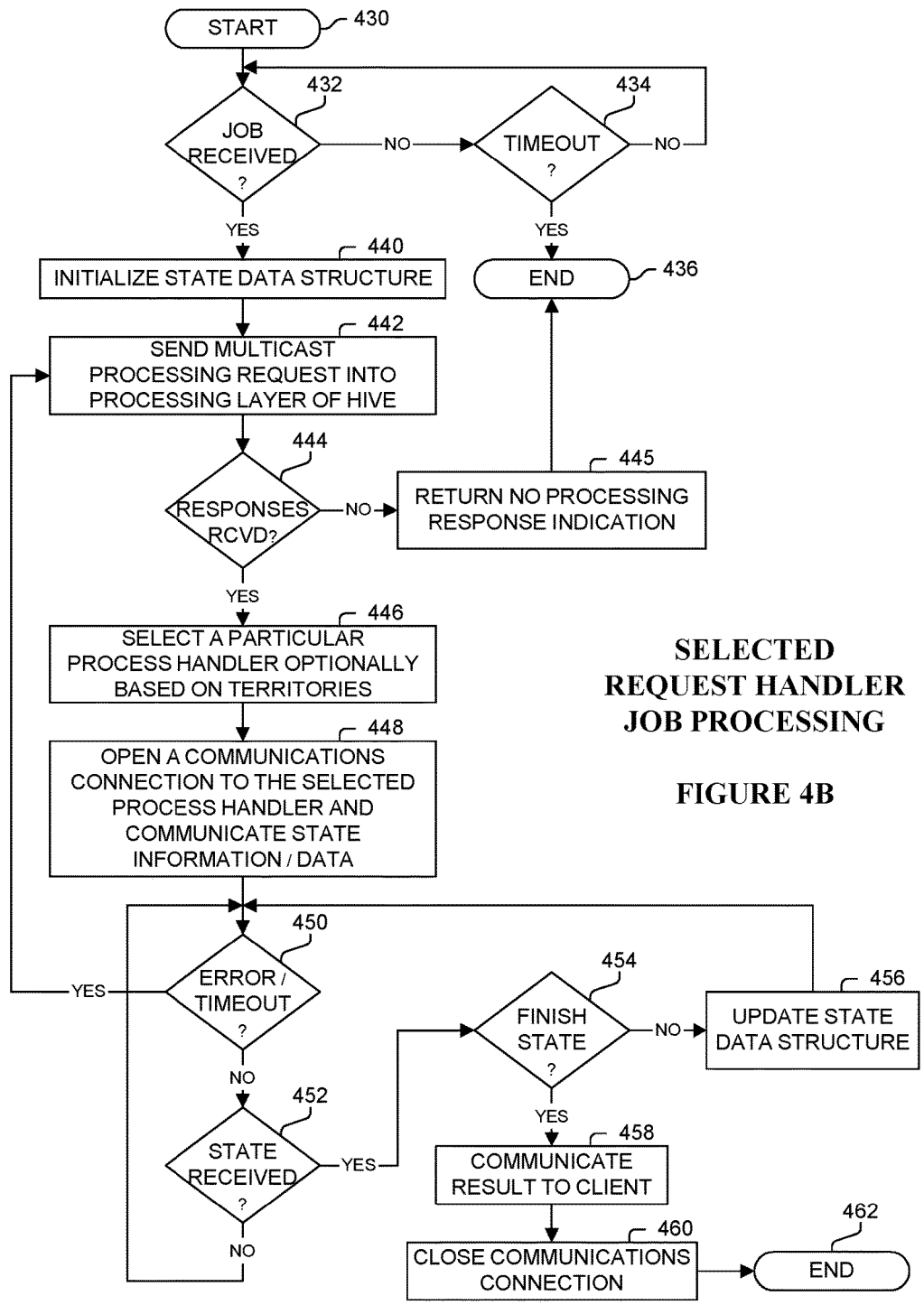
Figure 4C:
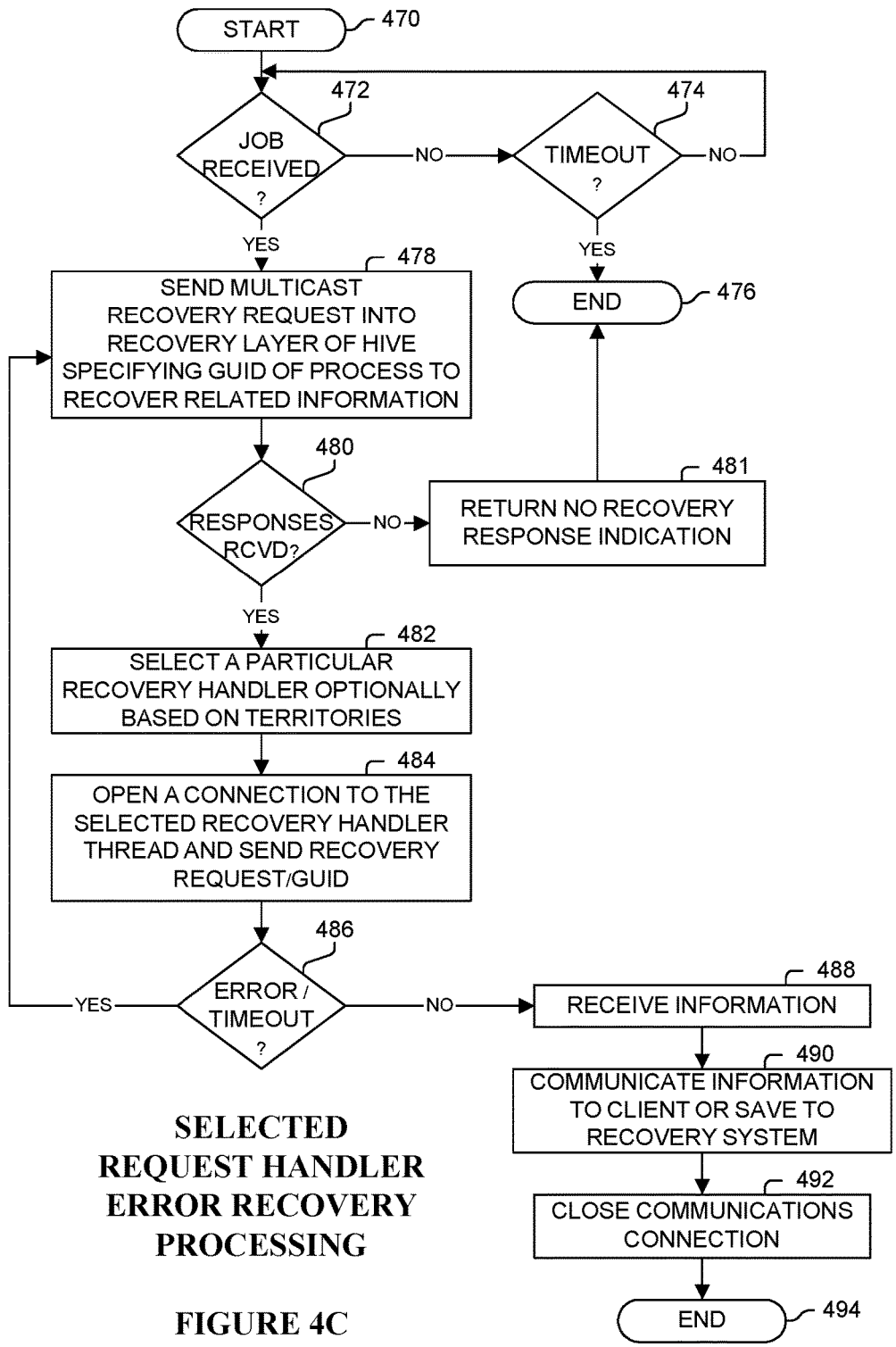

FIGS. 4A-C are flow diagrams of request handler processes used in one embodiment. FIG. 4A illustrates a process used in one embodiment for responding to service requests of clients. Processing begins with process block 400, and proceeds to process block 402, wherein a multicast port is opened for receiving service request messages. As determined in process blocks 404 and 406, until a service request is received and the request handler is available to handle the request, processing returns to process block 404. Otherwise, the request handler responds in process block 408 by sending a response message to the requesting client, with the response message typically identifying a port to use and the GUID of the received service request. As determined in process block 410, if the service request corresponds to a recovery request, then in process block 412, a recovery thread is initialized (such as that corresponding to the flow diagram of FIG. 4C) or the recovery operation is directly performed. Otherwise, in process block 414, a selected request handler thread is initialized (such as that corresponding to the flow diagram of FIG. 4B) or the request is handled directly. Processing returns to process block 404 to respond to more requests.

FIG. 4B illustrates a flow diagram of a process used by a selected request handler in one embodiment. Processing begins with process block 430, and loops between process blocks 432 and 434 until a job is received (and then processing proceeds to process block 440) or until a timeout condition is detected and in which case, processing is complete as indicated by process block 436.

After a processing job has been received (e.g., this process has been selected by the client to handle the request), a state data structure is initialized in process block 440. Then, in process block 442, a multicast processing request message is sent into one of the processing layers of the hive. As determined in process block 444, if no responses are received within a requisite timeframe, then a no processing handler response message is returned to the client in process block 445, and processing is complete as indicated by process block 436.

Otherwise, in process block 446, a particular process handler is selected. In one embodiment, this selection is performed based on territories (e.g., a process handler in a different territory than the selected request handler), other considerations or even on a random basis. In process block 448, a communications connection is established if necessary to the selected process handler, and the state information and data for the client processing request is sent (which may correspond to the initial state of the data received from the client or to an intermediate state of processing the client job request).

As determined in process block 450, if an error or timeout condition is detected, processing returns to process block 442. Otherwise, as determined in process block 452, until a state update message is received, processing returns to process block 450. As determined in process block 454, if the received state is not the finished or completed state, then in process block 456, the state data structure is updated, and processing returns to process block 450. Otherwise, processing has been completed, and in process block 458, the result is communicated to the client; in process block 460, the communications connection is closed; and processing is complete as indicated by process block 462.

FIG. 4C illustrates a flow diagram of a process used by a selected request handler performing error recovery in one embodiment. Processing begins with process block 470, and loops between process blocks 472 and 474 until a job is received (and then processing proceeds to process block 478) or until a timeout condition is detected and in which case, processing is complete as indicated by process block 476.

After a processing job has been received (e.g., this process has been selected by the client to perform the recover processing), in process block 478, a multicast recovery request message specifying the GUID of the job being recovered is sent into one or more of the recovery modules of the hive. As determined in process block 480, if no responses are received within a requisite timeframe, then a no recover response message is returned to the client in process block 481, and processing is complete as indicated by process block 476.

Otherwise, in process block 482, a particular recovery handler is selected, possibly based on territory considerations—such as a recovery handler in a different territory then this selected request handler. In process block 484, a communications connection is established if necessary to the selected recovery handler thread, and a recovery request is sent, typically including the GUID or other indication of the job to be recovered.

As determined in process block 486, if an error or timeout condition is detected, processing returns to process block 478. Otherwise, the recovered information is received as indicated by process block 488. In process block 490, the information is typically communicated to the client, or if this communication fails, it is saved to the recovery system. In one embodiment, the partially completed state, errors and/or other indications are stored to a local storage mechanism (e.g., some computer-readable medium) to be made available for use by a recovery process. In one embodiment, more significant process handling is performed, or the error communicating the error to another process, thread or hive engine for handling. The communications connection is then closed in process block 492, and processing is complete as indicated by process block 494.

Figure 5A:
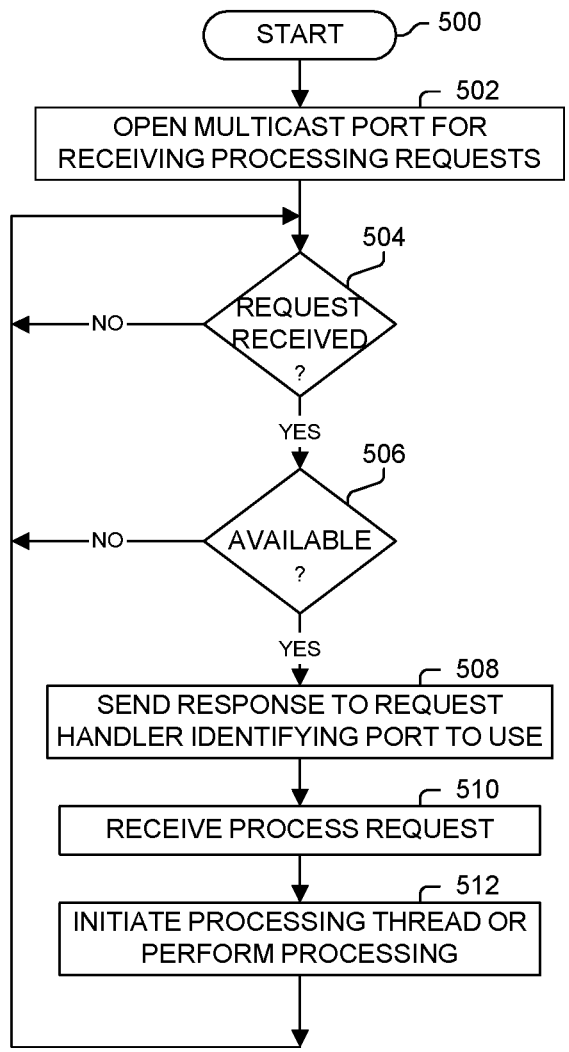
FIG. 5A-B are flow diagrams of process handler processes used in one embodiment.
Figure 5B:
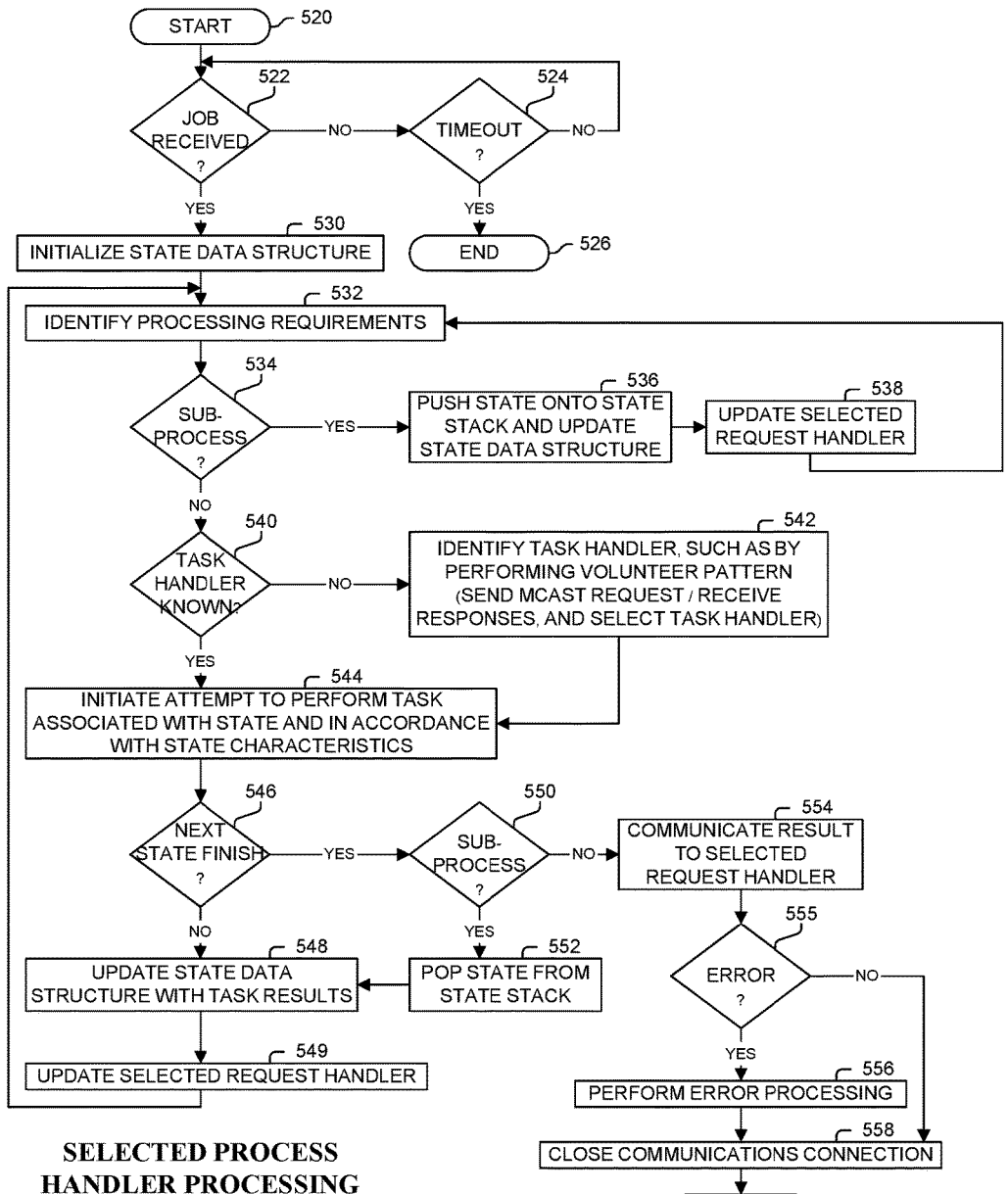

FIGS. 5A-B are flow diagrams of process handler processes used in one embodiment. FIG. 5A illustrates a process used in one embodiment for responding to service requests of request handlers. Processing begins with process block 500, and proceeds to process block 502, wherein a multicast port is opened for receiving processing request messages. As determined in process blocks 504 and 506, until a processing request is received and the process handler is available to handle the request, processing returns to process block 504. Otherwise, the process handler responds in process block 508 by sending a response message to the requesting request handler, with the response message typically identifying a port to use and possibly the GUID corresponding to the received processing request. The processing request is received in process block 510. Next, in process block 512, a selected process handler thread is initialized (such as that corresponding to the flow diagram of FIG. 5B) or the processing request is handled directly. Processing returns to process block 504 to respond to more requests.

FIG. 5B illustrates a flow diagram of a process used by a selected process handler in one embodiment. Processing begins with process block 520, and loops between process blocks 522 and 524 until a job is received (and then processing proceeds to process block 530) or until a timeout condition is detected and in which case, processing is complete as indicated by process block 526.

After a processing job has been received (e.g., this process has been selected by a selected request handler (or possibly other process handler) to handle the request), a state data structure is initialized in process block 530. In process block 532, the processing requirements of the next statement(s) within the process flow corresponding to the received job are identified. As determined in process block 534, if a sub-process is to be spawned (e.g., the process flow specifies a process flow to be executed), then in process block 536, the current state is pushed on to a state stack and the state is initialized to that of the new process flow, the selected request handler is updated in process block 538, and processing returns to process block 532 to process the new process flow.

Otherwise, as determined in process block 540, if the task handler is not already known (e.g., an optimization to perform the task on the same hive engine) such as it is not guaranteed to be performed locally, the task is a "limited task" in that it can only be performed by a subset of the task handlers or the processing of the task is made available to other hive engines (e.g., for performance or load balancing etc.), then in process block 542 the task handler to perform the task is identified. One embodiment identifies the task handler by sending a multicast task request messages, receives the responses, and selects, based on territory, load or other considerations, a task handler to perform the task.

Limited tasks provide a mechanism for identifying hive engines that have special hardware or other resources. Task handlers only on the hive engines with the specialized hardware or other resources possibly required to perform the task will be enabled to perform the corresponding task and thus these enabled task handlers will be the ones to respond to a task request for the corresponding task. Additionally, limited tasks provide a mechanism to limit the number of task handlers or hive engines allowed to access a particular resource by restricting the number and/or location of task handlers allowed to perform a task that accesses the particular resource. Thus, limited tasks may be useful to limit the rate or number of accesses to a particular resource (e.g., database engine, a storage device, a printer, etc.)

In process block 544, a task is initiated to perform the next operation identified in the current process flow with the current state information and characteristics (e.g., timeout, number of retries, etc.) on the identified, selected, or already known task handler. As determined in process block 546, after completion of the processing requirements of the processing statement(s), if the finish state has not been reached, then the state data structure is updated with the task result in process block 548, the selected request handler is updated with the current state information in process block 549, and processing returns to process block 532.

Otherwise, processing is completed of the current process flow as determined in process block 546, and if the current process flow is a sub-process (e.g., spawned process flow) (as determined in process block 550), then in process block 552, the state is popped from the state stack, and processing proceeds to process block 548. Otherwise, in process block 554, the result/state information is communicated to the selected request handler. As determined in process block 555, if an error has been detected, then error processing is performed in process block 556. In process block 558, the communications connection is closed, and processing is complete as indicated by process block 559. Note, in some embodiments, communications connections are not established and disconnected each time, but rather a same communications channel is used more than once.

Figure 5C:
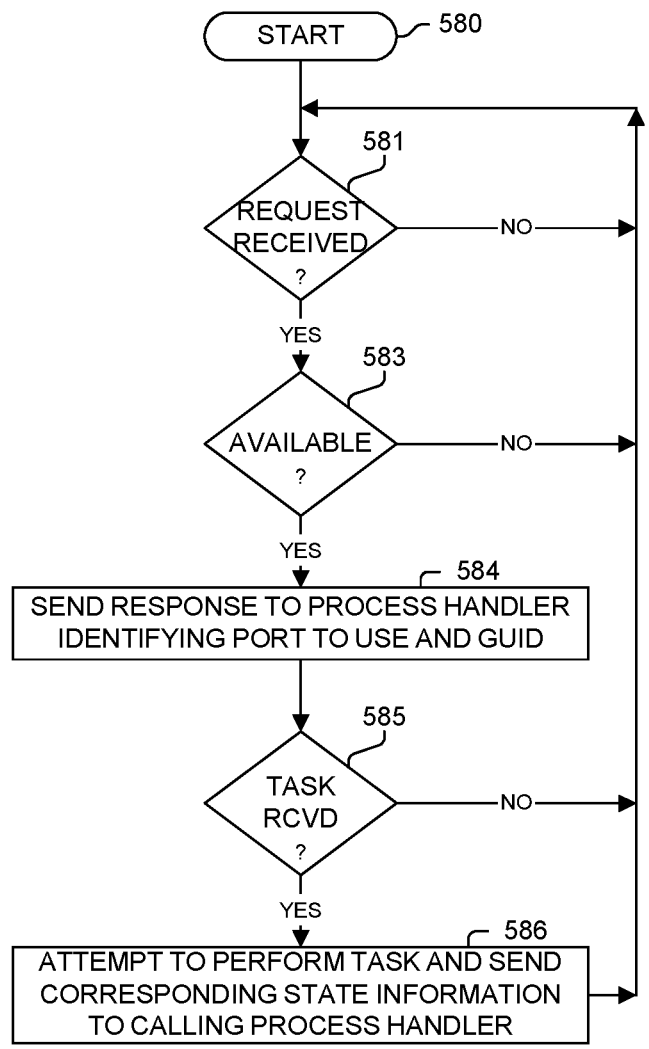
FIG. 5C is a flow diagram of a task handler process used in one embodiment.

FIG. 5C illustrates a flow diagram of a task handler performed by a hive engine in one embodiment. Processing begins with process block 580. As determined in process blocks 581 and 583, until a task request is received and the task handler is available to handle the request, processing returns to process block 581. Otherwise, the task handler responds in process block 584 by sending a response message to the requesting process (typically a process handler), with the response message typically identifying a port to use and the GUID of the received task request. As determined in process block 585, if the task is actually received (e.g., this task handler was selected by the process handler sending the task request), then in process block 586, the task is performed or at least attempted to be performed and resultant state information (e.g., completed state, partially completed state, errors and/or other indications) sent to the requesting process handler. Processing returns to process block 581. Note, in one embodiment, multiple processes illustrated in process block 5C or some variant thereof are performed simultaneously by a hive engine for responding to multiple task requests and/or performing tasks in parallel.

Figure 5D:
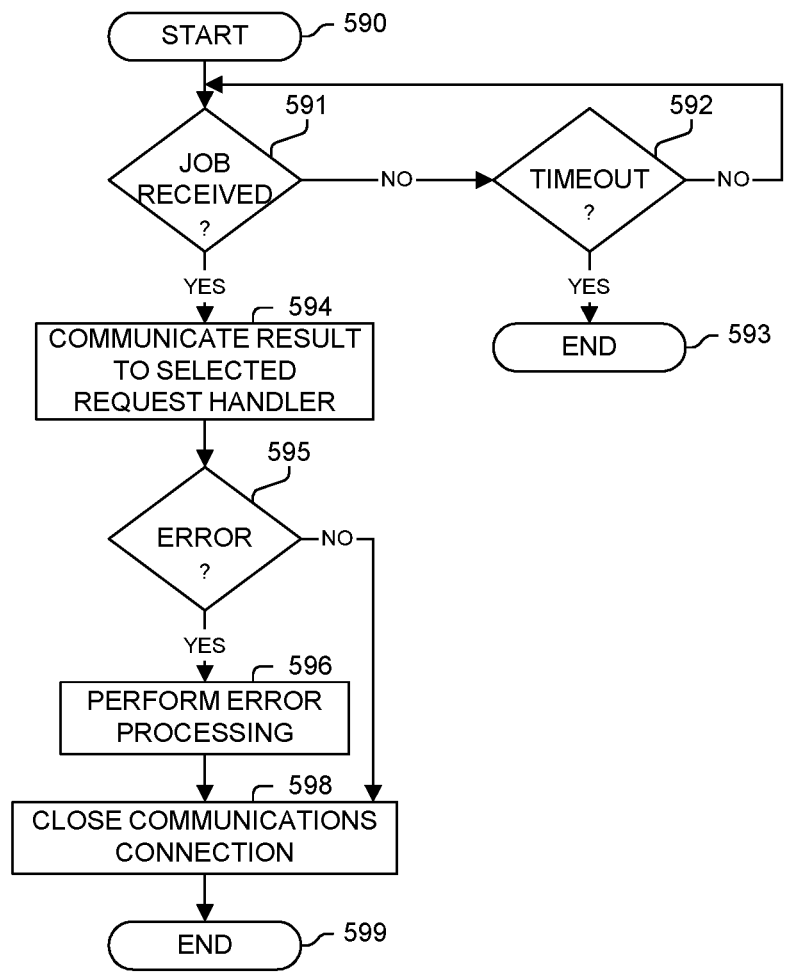
FIG. 5D is a flow diagram of a recovery layer process used in one embodiment.

FIG. 5D illustrates a flow diagram of a recovery processing performed by a hive engine in one embodiment. Processing begins with process block 590, and loops between process blocks 591 and 592 until a recovery job is received (and then processing proceeds to process block 594) or until a timeout condition is detected and in which case, processing is complete as indicated by process block 593. In process block 594, the recovery is retrieved from local storage and is communicated to the selected request handler. As determined in process block 595, if an error has been detected, then error processing is performed in process block 595. In process block 598, the communications connection is closed, and processing is complete as indicated by process block 599.

In one embodiment, a hive application is a collection of process flows that carry out specific sets of tasks. Applications can share process flows. An application definition file (XML descriptor file) typically describes the application, and the application definition file typically consists of the following: application name, process flow names, task names and module file names, support files, and/or configuration file names.

Figure 6A:
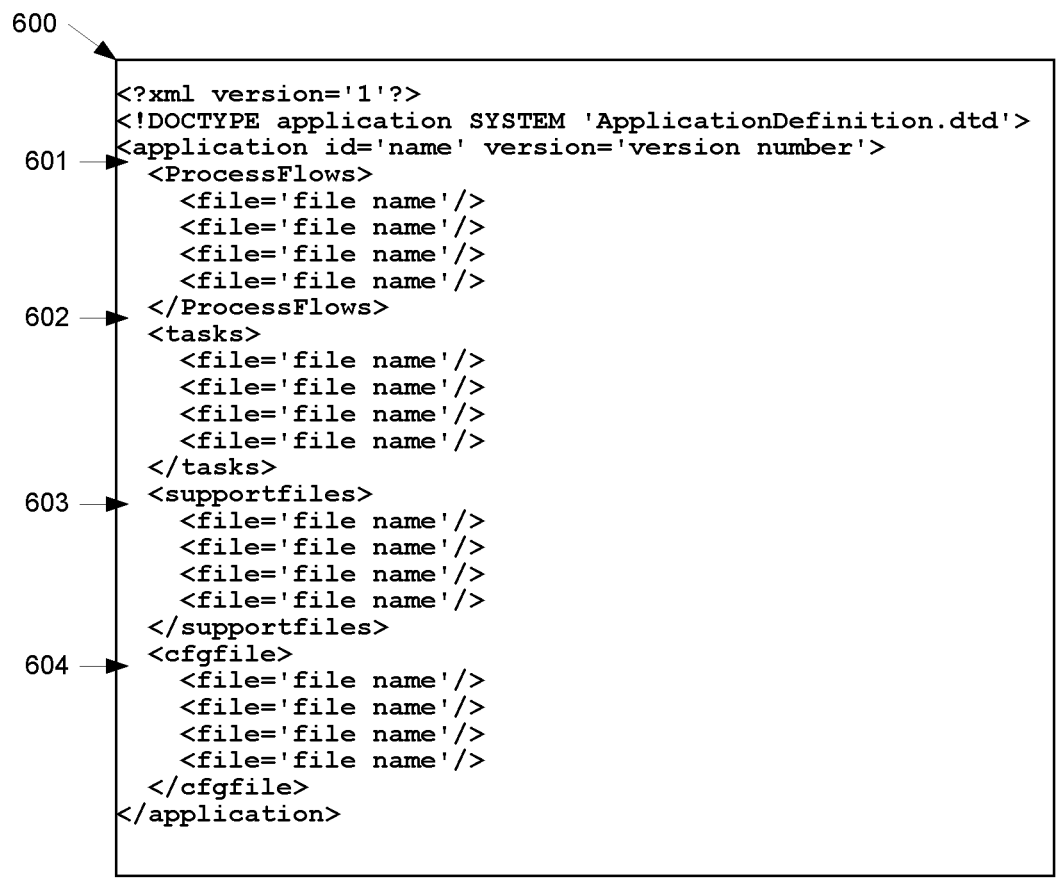
FIG. 6A illustrates a definition of an application used in one embodiment.

FIG. 6A illustrates an example definition file 600 of an application for use in one embodiment. As show, application definition file 600 specifies a set of corresponding process flows 601, tasks 602, support files 603, and configuration files 604.

FIG. 6B illustrates a definition of an process flow 620 "doProcessOne" used in one embodiment. Shown are four process flow statements 621-624, each specifying its beginning state, tasks to be performed, and next state depending on the outcome of the statements execution.

Figure 6C:
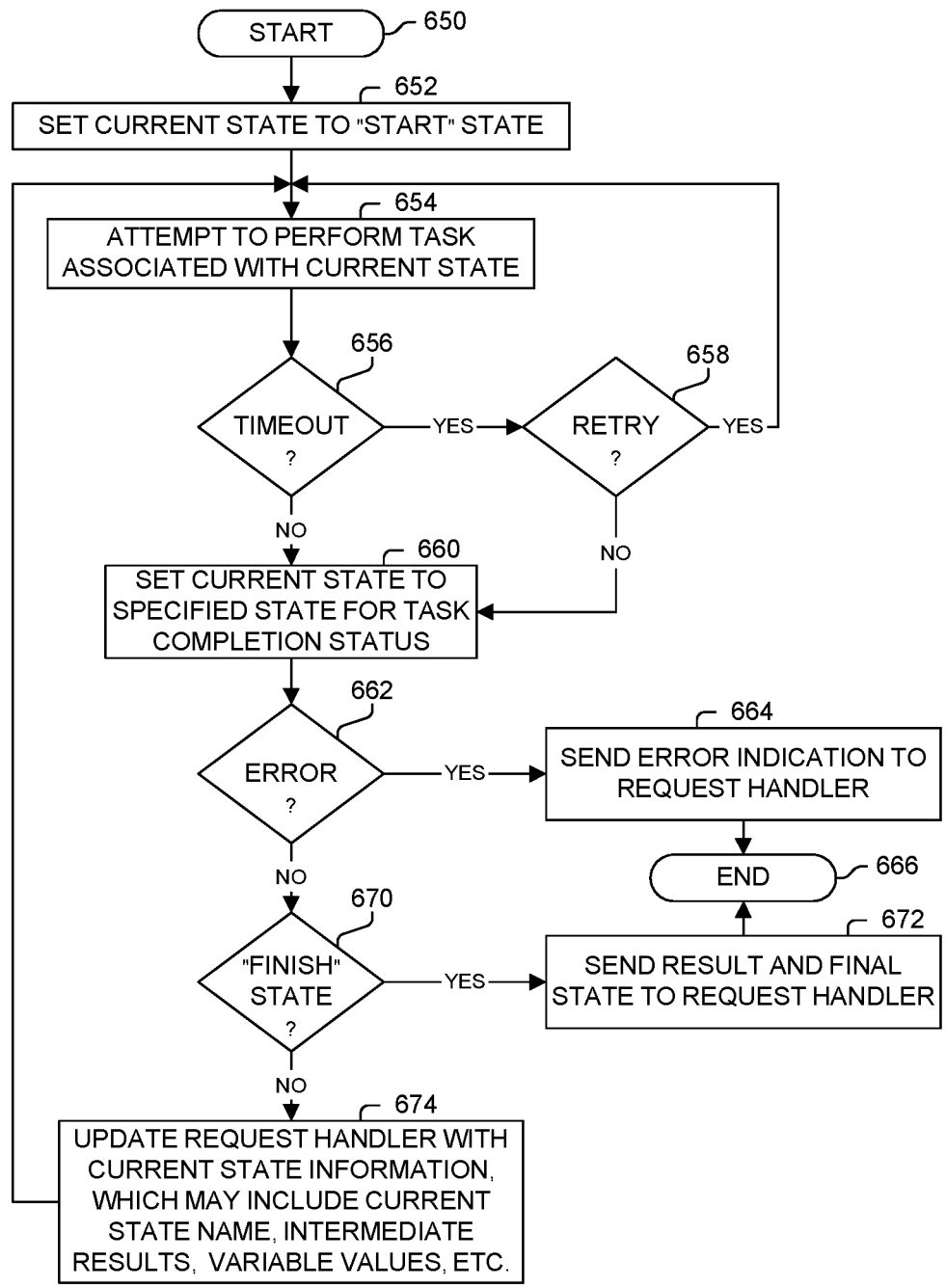
FIG. 6C illustrates a process used in one embodiment for executing a process flow.

FIG. 6C illustrates a process used in one embodiment for executing a process flow or processing job, such as that illustrated in FIG. 6B. Note, in one embodiment, the process illustrated in FIG. 5B is used to execute a process flow or processing job. In one embodiment, a combination of the processes illustrated in FIGS. 5B and 6C or another process is used to execute a process flow or processing job.

Turning to FIG. 6C, processing begins with process block 650, and proceeds to process block 652, wherein the current state is set to the START state. Next, in process block 654, the task associated with the current state is attempted to be performed. As determined in process block 656, if the task timed-out before completion, then as determined in process block 658, if the task should be retried (e.g., the number of retries specified in the process flow or a default value has not been exhausted), processing returns to process block 656. Otherwise, in process block 660, the current state is updated to that corresponding to the task's completion status (e.g., complete, non-complete, not-attempted, etc.). As determined in process block 662, if an error occurred (e.g., an invalid next state or other error condition), then an error indication is returned to the selected request handler in process block 664, and processing is complete as indicated by process block 666. Otherwise, if the next state is the FINISH state (as determined in process block 670), then the result and possibly a final set of state information is sent to the selected request handler in process block 672, and processing is complete as indicated by process block 672. Otherwise, in process block 674, the selected request handler is updated with current state information, such as, but not limited to (nor required to include) the current state name, intermediate results, variable values, etc. Processing then returns to process block 654.

Figure 7A:
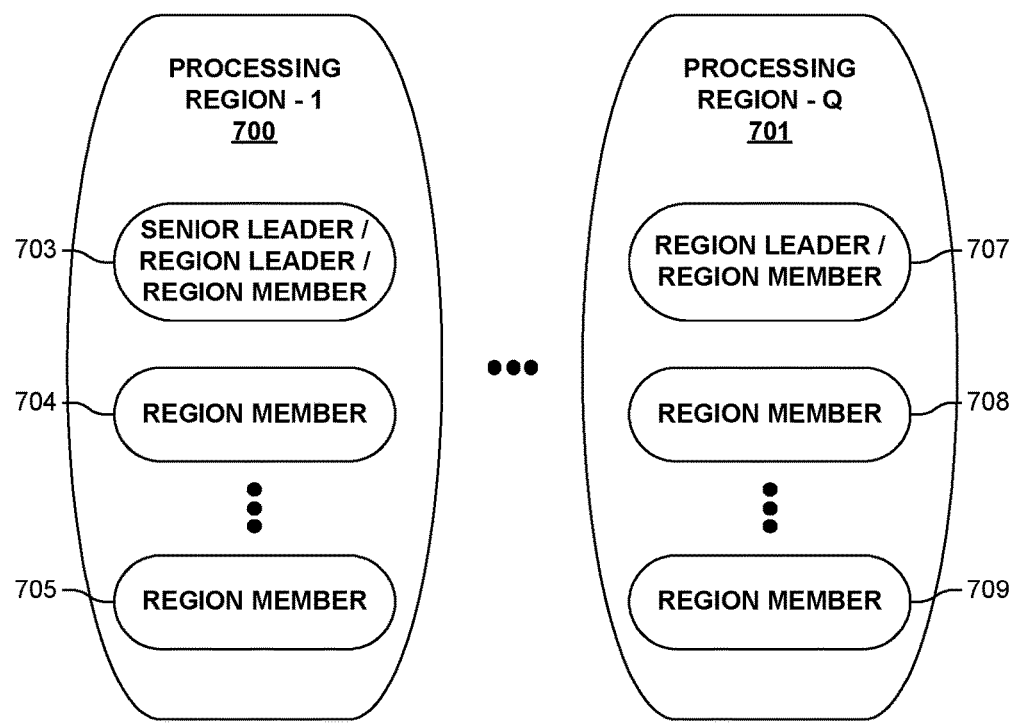
FIG. 7A illustrates a hierarchy of a senior region leaders, region leaders, and region members among multiple processing regions as used in one embodiment.

One embodiment of a hive uses a logical hierarchy of hive engines for delegation of performing administrative and/or other hive related tasks. In one embodiment, each hive engine participates in the processing region hierarchy as a region member with one hive engine in each processing region being a region leader, and there one overall senior region leader for the hive. For example, shown in FIG. 7A are multiple processing regions 700-701, having an overall senior region leader 703 (denoted senior leader/region leader/region member as it performs all functions) residing in processing region 700, a region leader/region member 707 in processing region 701, region members 704-705 in processing region 700, and region members 708-709 in processing region 701.

Figure 7B:
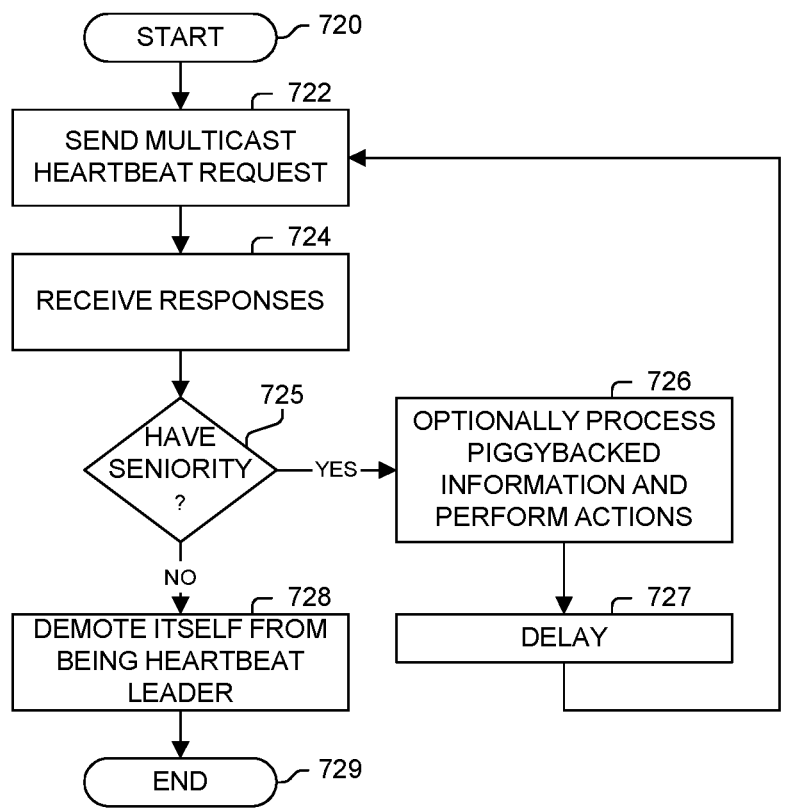
FIGS. 7B-7C are flow diagrams of processes used in one embodiment to establish and maintain a hierarchical relationship among distributed processes.
Figure 7C:
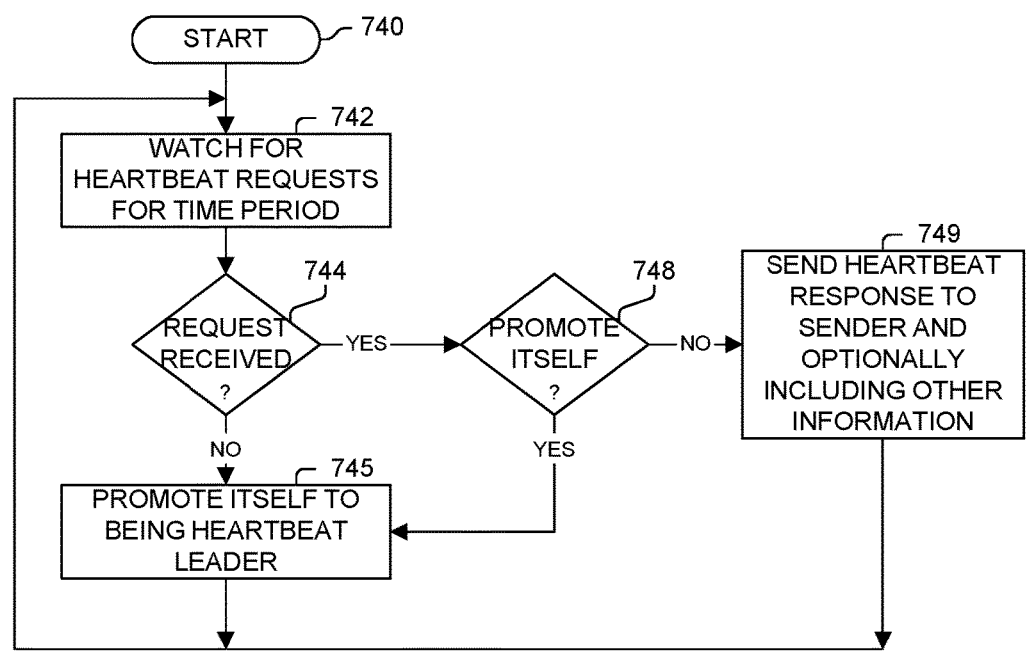

FIGS. 7B-7C are flow diagrams of processes used in one embodiment to establish and maintain this hierarchical relationship among distributed processes or systems, such as among hive engines. The generic terms of heartbeat leader and heartbeat member are used in describing this process, because it can be used in many different applications for establishing and maintaining a hierarchical relationship in a set of dynamic and autonomous processes and systems. For example, in one embodiment, the processes illustrated in FIGS. 7B-C are used to establish and maintain which hive engine in a region is the region leader, and between region leaders for establishing which hive engine is the senior region leader.

Processing of the heartbeat leader flow diagram illustrated in FIG. 7B begins with process block 720, and proceeds to process block 722 wherein a multicast heartbeat request message is sent on the multicast address belonging to the group in which the hierarchical relationship is being established and maintained. In process block 724, the responses are received. As determined in process block 725, if the process is senior over those from which a response was received, then it remains the leader or senior process, and optionally in process block 726, piggybacked information (e.g., number of regions, number of members in each region, etc.) is processed and possibly actions taken or initiated in response. As indicated by process block 727, the process delays or waits a certain period of time before repeating this process, and then processing returns to process block 722. Otherwise, in process block 728, the process demotes itself from being the leader or senior process (such as by initiating or switching to performing actions consistent with being a region member if not already performing the functions of a region member), and processing is complete as indicated by process block 729.

Processing of the heartbeat member flow diagram illustrated in FIG. 7C begins with process block 740, and proceeds to process block 742, wherein the process watches for and identifies heartbeat request messages during a predetermined timeframe. As determined in process block 744, if a no heartbeat request is received, then in process block 745, the process promotes itself to being the heartbeat leader, and processing returns to process block 742. Otherwise, if this process is senior to a process sending a heartbeat request message as determined in process block 748, then processing proceeds to process block 745 to promotes itself. Otherwise, in process block 749, a heartbeat response message is sent to the sender of the received heartbeat request message, and optionally other information is included in the heartbeat response message. Processing then returns to process block 742. Note, determining seniority can be performed in numerous manners and mechanisms, such as that based on some physical or logical value associated with a hive engine (e.g., one of its network addresses, its serial number, etc.)

FIG. 8A illustrates some of the functions performed by a senior processing region leader in one embodiment. Processing begins with process block 800, and proceeds to process block 802, wherein a heartbeat request is sent to all region leaders, typically by sending a multicast packet to the processing region leader intercommunication multicast address 242 (FIG. 2C) and piggybacked information is collected from received responses with this information typically including, but not limited to the number of processing regions, number of processing handlers, number of request handlers, limited task information, etc. As determined in process block 804, if the number of request handlers needs to be adjusted (e.g., there are too few or too many), then in process block 806, a region leader is selected and directed to start or stop a request handler. Next, as determined in process block 808, if the number of processing regions needs to be adjusted (e.g., there are too few or too many), then in process block 810, a region leader is selected and directed to disband or spit a region. Next, as determined in process block 812, if the number of task handlers that can perform a particular task (i.e., a "limited task" as typically and by default, all tasks can be performed by all task handlers) needs to be adjusted (e.g., there are too few or too many), then in process block 814, a region leader is selected and directed to adjust the number of task handlers within its region which can perform the particular limited task. Next, as determined in process block 816, if some other action needs to be performed, then in process block 818, the action is performed or a region leader is instructed to perform the action. Next, processing usually waits or delays for a predetermined or dynamic amount of time as indicated by process block 819, before processing returns to process block 802.

FIG. 8B illustrates some of the functions performed by a region leader in one embodiment. Processing begins with process block 830, and proceeds to process block 832, wherein a heartbeat request is sent to all region member, typically by sending a multicast packet to the processing region multicast address 244 (FIG. 2C), and piggybacked information is collected from received responses with this information typically including, but not limited to the number of processing handlers, number of request handlers, etc.; or possibly instructions are received from the senior region leader. As determined in process block 834, if the number of request handlers needs to be adjusted (e.g., there are too few or too many), then in process block 836, a process handler is selected and directed to start or stop a request handler. Next, as determined in process block 838, if the number of processing regions needs to be adjusted (e.g., there are too few or too many), then in process block 840, an instruction to disband or spit the region is issued. Next, as determined in process block 842, if the number of task handlers permitted to perform a particular limited task needs to be adjusted (e.g., there are too few or too many), then in process block 844, an instruction is provided (directly, indirectly such as via a request or process handler, or based on a volunteer pattern) to a particular task handler to permit or deny it from performing the particular limited task. Next, as determined in process block 846, if some other action needs to be performed, then in process block 848, the action is performed or a process handler is instructed to perform the action. Next, processing usually waits or delays for a predetermined or dynamic amount of time as indicated by process block 849, before processing returns to process block 832.

Figure 8C:
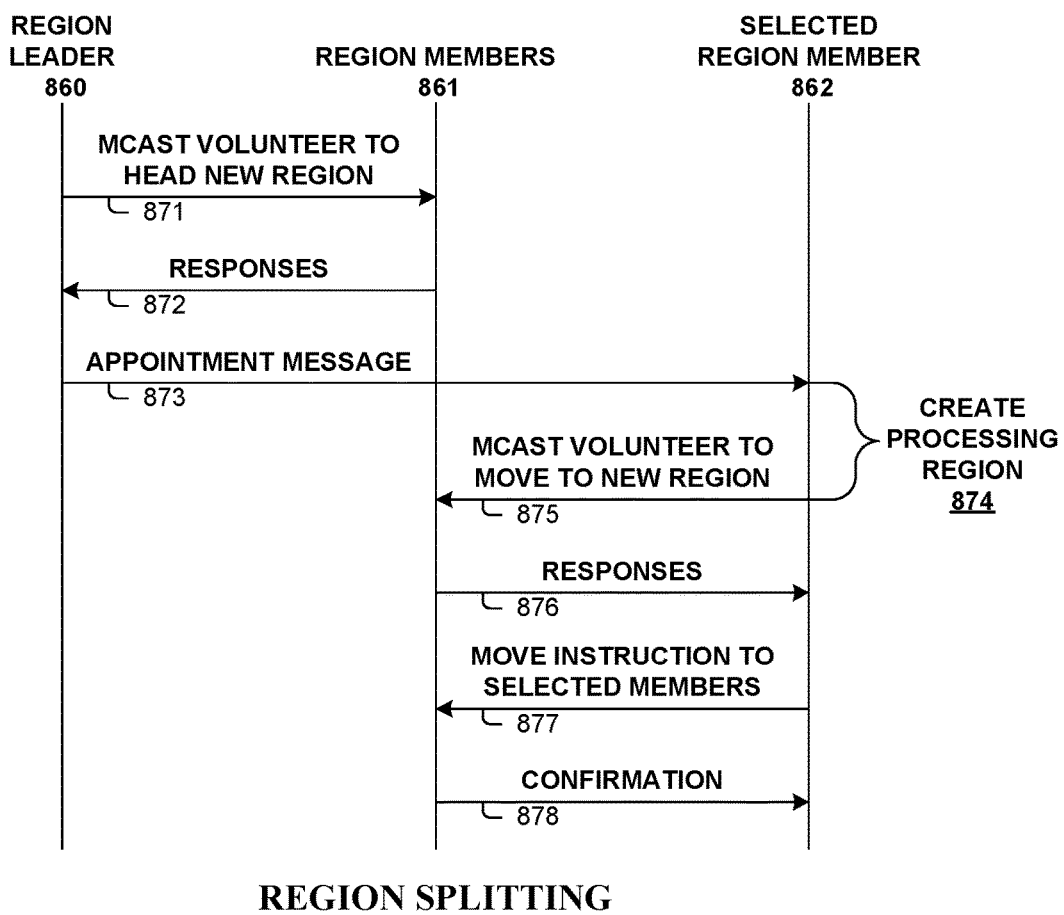
FIG. 8C illustrates the splitting of a region as performed in one embodiment.

FIG. 8C illustrates the splitting of a region as performed in one embodiment. Region leader 860 sends a multicast message 871 requesting a volunteer to head the new region to region members 861, some of which typically return a positive response message 872. Region leader 860 then identifies a selected region member 862 to head the new processing region, and sends an appointment message 873 to selected region member 862. In response, selected region member 862 creates a new processing region as indicated by reference number 874, typically including identifying an unused processing region multicast address 244 (FIG. 2C) as it monitored the traffic or processing region active indication messages sent to processing region active region indications multicast address 243. Then, selected region member 862 multicasts a volunteer message 875 to processing regions in the old (and still used) processing region and typically receives one or more responses 876. Selected region member 862 then selects a certain number, typically half of the number of process handlers in the old processing region, of responding process handlers, and notifies them to switch to the new processing region via move instruction 877, and they in turn, send a confirmation message 878 to selected region member 862.

Figure 9:
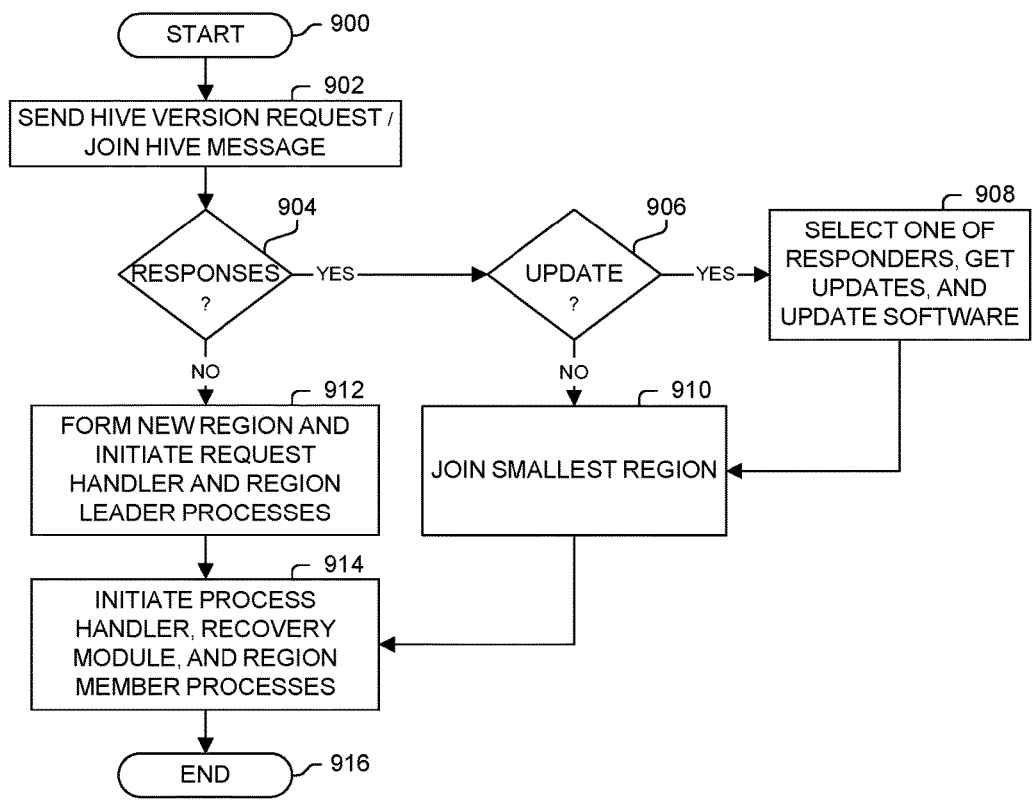
FIG. 9 illustrates a process used in one embodiment for initializing a hive engine.

FIG. 9 illustrates a process used in one embodiment for initializing a hive engine. Processing begins with process block 900, and proceeds to process block 902, wherein a hive version request and hive join multicast message is sent typically to all region leaders. As determined in process block 904, if no responses are received, then in process block 912, a new processing region is formed, and request handler and region leader processes are initiated. Next, in process block 914, process handler, recovery module, and region member processes are initiated, and startup processing is completed as indicated by process block 916. Otherwise, as determined in process block 906, if a hive software update is available, then, in process block 908, one of the responders is selected, the updates are acquired, and the software (e.g., hive software, operating system, etc.) is updated. In process block 910, the hive engine joins the smallest or possibly one of the smaller processing regions, possibly with this selection being determined by identified territories, and processing proceeds to process block 914.

In one embodiment, the hive is updated by a client with special administrative privileges. This administrative client sends a request to the senior region leader of the hive. The senior region leader opens a TCP connection and sends the administration client the connection information. The administration client sends the new application to the senior region leader. When the senior region leader receives an update, the senior region leader multicasts the update command to all the hive members. The senior region leader sends multicast message containing the name of the file that is being updated, the new version, and the total number of packets each hive member should receive. The senior region leader then multicasts the data packets, each packet typically includes the file id, the packet number, and data. If a hive member does not receive a packet, that hive member sends a request to the senior region leader for the missing packet. The senior region leader resends, multicasts, the missing packet. The hive members store the update in a staging area until they receive the activation command. To activate an update, the administration client sends the activation command to the senior region leader. The senior region leader multicasts the activate command to the hive members. The hive members remove the old application or files and moves the update from the staging area to the production area. To update the hive software or operating system, the senior region leader distributes the updates and restarts volunteers in a rolling fashion. When the hive service manager detects a new version of itself, the service manager forks the process and restarts with a new version. Also, the senior region leader can send other update commands. An active message indicates that the corresponding application, patch, or OS that should be running on the hive. A deactivated messages indicates that the corresponding application, patch, or OS should not be running on the hive and should remain installed on hive members. A remove message indicates that the corresponding application, patch, or OS was once installed on the Hive and any instances found on Hive members should be removed. This allows hive engines to be updated and also to move back to previous releases.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A system for applying a distributed computing architecture to enhance task processing with high availability computing power, the system comprising:
    a decentralized distributed computing network that executes a processing job in a distributed manner, wherein the decentralized distributed computing network comprises a plurality of networked computers, the plurality of networked computers comprising a request handler, a plurality of process handlers, and a plurality of task handlers, the process handlers being resident on a plurality of different networked computers, the task handlers being resident on a plurality of different networked computers, the processing job having an associated process flow, the process flow including (1) a plurality of tasks without a specification as to which of the networked computers are to perform the tasks and (2) logic that defines a relationship between the tasks;
    wherein the decentralized computing network is configured to distributively execute the processing job via a plurality of operations, wherein the operations comprise:
        the request handler receiving a service request for the processing job;
        the decentralized distributed computing network storing state information for the processing job;
        at least one process handler among the plurality of process handlers volunteering for servicing the processing job corresponding to the received service request based on its availability for servicing the processing job, the at least one process handler thus being a volunteer process handler;
        the volunteer process handler (1) analyzing the state information for the processing job to determine whether any tasks in the process flow remain to be performed based on the logic for the process flow, (2) in response to the state information analysis indicating that a task remains for the process flow, identifying a task from the process flow to be performed, and (3) in response to the state information analysis indicating that no tasks remain for the process flow, determining that the processing job has been completed;
        for each of a plurality of the identified tasks, at least one task handler among the plurality of task handlers volunteering for performing that identified task based on it being able to perform that identified task, the at least one task handler thus being a volunteer task handler;
        each volunteer task handler performing an identified task to generate a task result; and
        the decentralized distributed computing network storing updated state information for the processing job, the updated stored state information being based on the task results.

2. The system of claim 1 wherein the decentralized computing network is further configured to repeat the operations with respect to a plurality of service requests for a plurality of processing jobs to provide distributed processing by the decentralized distributed computing network of the processing jobs such that a plurality of the process handlers serve as volunteer process handlers for the processing jobs and a plurality of the task handlers serve as volunteer task handlers for the processing jobs.

3. The system of claim 1 wherein the operations further comprise:
    the request handler and the volunteer process handler redundantly storing portions of the state information for the processing job.

4. The system of claim 1 wherein the operations further comprise:
    the request handler communicating a volunteer request for a processing job to a plurality of the process handlers; and
    a plurality of the process handlers deciding whether to volunteer for servicing the processing job corresponding to the communicated volunteer request based on the communicated volunteer request.

5. The system of claim 1 wherein the operations further comprise:
the volunteer process handler communicating a volunteer request for an identified task to a plurality of the task handlers; and
a plurality of the task handlers deciding whether to volunteer for performing the identified task corresponding to the communicated volunteer request based on the communicated volunteer request.

6. The system of claim 1 wherein a plurality of the networked computers on which a plurality of the task handlers reside have different resources, and wherein the operations further comprise:
a plurality of the task handlers deciding whether to volunteer for performing the identified tasks as a function of the resources of the networked computers on which the task handers are resident.

7. The system of claim 1 wherein each of a plurality of the networked computers comprises a process handler and a task handler.

8. The system of claim 1 wherein the operations further comprise:
the request handler assigning a global unique identifier (GUID) to the processing job;
the request handler determining whether a recovery procedure is to be initiated for the processing job; and
in response to a determination that a recovery procedure is to be initiated for the processing job, the request handler generating a recovery request message that includes the GUID.

9. The system of claim 1 wherein a plurality of the networked computers are arranged as a plurality of processing regions, each of a plurality of the processing regions comprising a plurality of the process handlers and a plurality of the task handlers, and wherein the operations further comprise:
the volunteer process handler limiting solicitation of volunteer task handlers to only task handlers within its own processing region.

10. A system for applying a distributed computing architecture to enhance task processing with high availability computing power, the system comprising:
a plurality of networked computers that are arranged as a decentralized distributed computing network to distributively process a plurality of processing jobs in accordance with a plurality of process flows that are associated with the processing jobs, wherein each of a plurality of the process flows comprises (1) a plurality of tasks for that process flow without a specification as to which of the networked computers are to perform the tasks, and (2) logic that defines a relationship between that process flow's tasks;
wherein (1) each of a first plurality of the networked computers comprises a request handler deployed thereon, (2) each of a second plurality of the networked computers comprises a process handler deployed thereon, and (3) each of a third plurality of the networked computers comprises a task handler deployed thereon such that a plurality of the request handlers, process handlers, and task handlers are distributed among the networked computers;
wherein the decentralized distributed computing network is further configured to allocate work for the processing jobs among a plurality of volunteers in a decentralized manner, wherein the volunteers comprise a plurality of volunteers among the process handlers and a plurality of volunteers among the task handlers;
wherein a plurality of the request handlers are configured to receive a plurality of service requests for a plurality of the processing jobs;
wherein the decentralized distributed computing network is further configured to store state information for the processing jobs corresponding to the received service requests;
wherein each of a plurality of the volunteer process handlers is configured to (1) analyze (i) the state information for a processing job and (ii) the logic for the process flow associated with that processing job to determine whether any tasks remain to be performed for that processing job, (2) in response to the analysis indicating that a task remains for that processing job, identify a task to be performed, and (3) in response to the analysis indicating that no tasks remain for that processing job, determine that that processing job has been completed;
wherein each of a plurality of the volunteer task handlers is configured to perform an identified task such that a plurality of the volunteer task handlers generate a plurality of task results; and
wherein the decentralized distributed computing network is further configured to store updated state information for the processing jobs, the updated stored state information being based on the task results.

11. The system of claim 10 wherein each of a plurality of the process handlers is configured to volunteer for servicing the processing jobs based on their availabilities for servicing the processing jobs.

12. The system of claim 11 wherein each of a plurality of the task handlers is configured to volunteer for tasks of the processing jobs based on their being able to perform the tasks.

13. The system of claim 10 wherein each of a plurality of the task handlers is configured to volunteer for tasks of the processing jobs based on their being able to perform the tasks.

14. The system of claim 10 wherein each of a plurality of the request handlers is configured to generate a plurality of volunteer requests for servicing the processing jobs; and
wherein each of a plurality of the process handlers is further configured to (1) read the generated volunteer requests and (2) decide whether to volunteer for servicing process jobs based on the read volunteer requests.

15. The system of claim 14 wherein each of a plurality of the request handers is further configured to select a volunteer process handler for servicing a processing job from among a plurality of volunteer process handlers for that processing job.

16. The system of claim 15 wherein each of a plurality of the request handlers is further configured to send the generated volunteer requests to a plurality of the process handlers for reading thereby.

17. The system of claim 10 wherein each of a plurality of the volunteer process handlers is further configured to generate a plurality of volunteer requests for performing identified tasks; and
wherein each of a plurality of the task handlers is further configured to (1) read the generated volunteer requests and (2) decide whether to volunteer for tasks of the processing jobs based on the read volunteer requests.

18. The system of claim 10 wherein a plurality of members of the second plurality of the networked computers are also members of the third plurality of the networked computers.

19. The system of claim 10 wherein the decentralized distributed computing network is further configured to organize a plurality of the networked computers into a plurality of processing regions, each processing region comprising a plurality of the first and second plurality of the networked computers.

20. The system of claim 19 wherein the decentralized distributed computing network is further configured to limit the volunteer process handlers and the volunteer task handlers for a processing job to only those process handlers and task handlers that reside in the same processing region.

* * * * *